US012139884B2

(12) United States Patent
Katoh et al.

(10) Patent No.: US 12,139,884 B2
(45) Date of Patent: Nov. 12, 2024

(54) WORK VEHICLE, LEVER UNIT, AND ACTUATOR AUTOMATIC CONTROL METHOD

(71) Applicant: KOMATSU LTD., Tokyo (JP)

(72) Inventors: Masashi Katoh, Tokyo (JP); Yuuki Kobayashi, Tokyo (JP); Keisuke Kubota, Tokyo (JP)

(73) Assignee: KOMATSU LTD., Tokyo (JP)

( * ) Notice: Subject to any disclaimer, the term of this patent is extended or adjusted under 35 U.S.C. 154(b) by 265 days.

(21) Appl. No.: 17/639,145

(22) PCT Filed: Sep. 15, 2020

(86) PCT No.: PCT/JP2020/034905
§ 371 (c)(1),
(2) Date: Feb. 28, 2022

(87) PCT Pub. No.: WO2021/054320
PCT Pub. Date: Mar. 25, 2021

(65) Prior Publication Data

US 2022/0316179 A1 Oct. 6, 2022

(30) Foreign Application Priority Data

Sep. 17, 2019 (JP) ................................. 2019-168452

(51) Int. Cl.

| | |
|---|---|
| ***B02C 17/18*** | (2006.01) |
| ***E02F 9/20*** | (2006.01) |
| ***E02F 9/22*** | (2006.01) |
| ***E02F 9/26*** | (2006.01) |
| ***G05G 1/52*** | (2008.04) |

(52) U.S. Cl.
CPC .......... *E02F 9/2004* (2013.01); *E02F 9/2246* (2013.01); *E02F 9/264* (2013.01); *G05G 1/52* (2013.01)

(58) Field of Classification Search
CPC .. G05G 5/02; G05G 9/047; G05G 1/52; E02F 9/20; E02F 9/2004; E02F 9/92246
USPC ........................................................... 701/50
See application file for complete search history.

(56) References Cited

U.S. PATENT DOCUMENTS

| | | | | |
|---|---|---|---|---|
| 9,227,560 | B2 * | 1/2016 | Kikuchi ................. | B60Q 1/425 |
| 10,625,592 | B2 * | 4/2020 | Imai ....................... | B60K 6/445 |
| 11,149,404 | B2 * | 10/2021 | Suzuki .................. | E02F 9/2004 |

(Continued)

FOREIGN PATENT DOCUMENTS

| | | |
|---|---|---|
| CN | 102639791 A | 8/2012 |
| CN | 103141090 A | 6/2013 |

(Continued)

OTHER PUBLICATIONS

The Office Action for the corresponding Chinese application No. 202080054470.X, issued on Sep. 30, 2022.

(Continued)

*Primary Examiner* — Andrew Joseph Rudy
(74) *Attorney, Agent, or Firm* — Global IP Counselors, LLP

(57) ABSTRACT

A work vehicle includes an operating lever configured to operate a work implement, an actuator configured to move the operating lever, and a control section configured to control the actuator to move the operating lever to a retreat position outside an operation range of the operating lever.

20 Claims, 14 Drawing Sheets

(56) References Cited

U.S. PATENT DOCUMENTS

| | | | | |
|---|---|---|---|---|
| 11,549,237 | B2 * | 1/2023 | Mizuno | E02F 9/2004 |
| 2012/0205171 | A1 | 8/2012 | Takishita et al. | |
| 2012/0305821 | A1 | 12/2012 | Kubo | |
| 2013/0182066 | A1 | 7/2013 | Ishimoto | |
| 2022/0106773 | A1 * | 4/2022 | Iwasaki | E02F 9/265 |

FOREIGN PATENT DOCUMENTS

| | | | |
|---|---|---|---|
| JP | 9-302726 | A | 11/1997 |
| JP | 2000-179010 | A | 6/2000 |
| JP | 2002-146839 | A | 5/2002 |
| JP | 2002-285587 | A | 10/2002 |
| JP | 2006-144349 | A | 6/2006 |
| JP | 2006-241908 | A | 9/2006 |
| JP | 2016-3455 | A | 1/2016 |
| JP | 2019-108742 | A | 7/2019 |
| KR | 10-2012-0095998 | A | 8/2012 |
| WO | 2013/045034 | A1 | 4/2013 |

OTHER PUBLICATIONS

The Office Action for the corresponding Korean application No. 10-2022-7002691, issued on Jun. 29, 2023.
The International Search Report for the corresponding international application No. PCT/JP2020/034905, issued on Nov. 17, 2020.
The Office Action for the corresponding Japanese application No. 2021-546911, issued on Sep. 3, 2024.

* cited by examiner

WORK VEHICLE, LEVER UNIT, AND ACTUATOR AUTOMATIC CONTROL METHOD

CROSS-REFERENCE TO RELATED APPLICATIONS

This application is a U.S. National stage application of International Application No. PCT/JP2020/034905, filed on Sep. 15, 2020. This U.S. National stage application claims priority under 35 U.S.C. § 119(a) to Japanese Patent Application No. 2019-168452, filed in Japan on Sep. 17, 2019, the entire contents of which are hereby incorporated herein by reference.

BACKGROUND

Filed of the Invention

The present invention relates to a work vehicle, a lever unit and an actuator automatic control method.

Background Information

In the cab of a work vehicle such as a hydraulic excavator, the entrance/exit door is arranged on the side of the driver's seat, and the operating lever is also arranged on the side of the driver's seat. Therefore, the passage for getting on and off the cab is narrow and it is difficult to get on and off.

Therefore, a configuration is disclosed in which the entire console including the operating lever is flipped up to secure a passage space for the operator to get on and off (see, for example, Japanese Patent Application 2002-146839).

SUMMARY

However, in the case of the flip-up type configuration, a large operating force is required because the entire console is flipped up together with the frame.

An object of the present invention is to provide a work vehicle, a lever unit, and an actuator automatic control method capable of securing a passage space for getting on and off without the need for an operator's operating force.

The work vehicle of the disclosure includes an operating lever, an actuator, and a control section. The operating lever operates a work implement. The actuator moves the operating lever. The control section controls the actuator to move the operating lever to a retreat position outside an operating range of the operating lever.

The work vehicle of the disclosure includes an operating lever, an actuator, and a control section. The operating lever operates the work implement. The actuator moves the operating lever. The control section performs control of driving the actuator to move the operating lever to a retreat position when acquiring information to determine the operator's getting on and determining that the operator gets on.

The lever unit of the disclosure includes an operating lever, an actuator, and a holding section. The operating lever operates a work implement. The actuator moves the operating lever. The holding section holds the operating lever at a retreat position outside an operating range of the operating lever.

The actuator automatic control method of the disclosure is a method for automatically controlling an actuator of an operating lever for operating a work implement, and includes a generation step and a transmission step. The generation step generates a control signal of an actuator for moving the operating lever to a retreat position outside an operating range of the operating lever. The transmission step transmits a control signal to the actuator.

According to the present disclosure, it is possible to provide a work vehicle, a lever unit, and an actuator automatic control method capable of securing a passage space for getting on and off without imposing a burden on an operator.

DETAILED DESCRIPTION OF EMBODIMENT(S)

Hereinafter, the hydraulic excavator 1 (an example of a work vehicle) of the embodiment according to the present invention will be described with reference to the drawings.

Embodiment 1

(Configuration)

(Overview of the Configuration of the Hydraulic Excavator 1)

Figure 1:
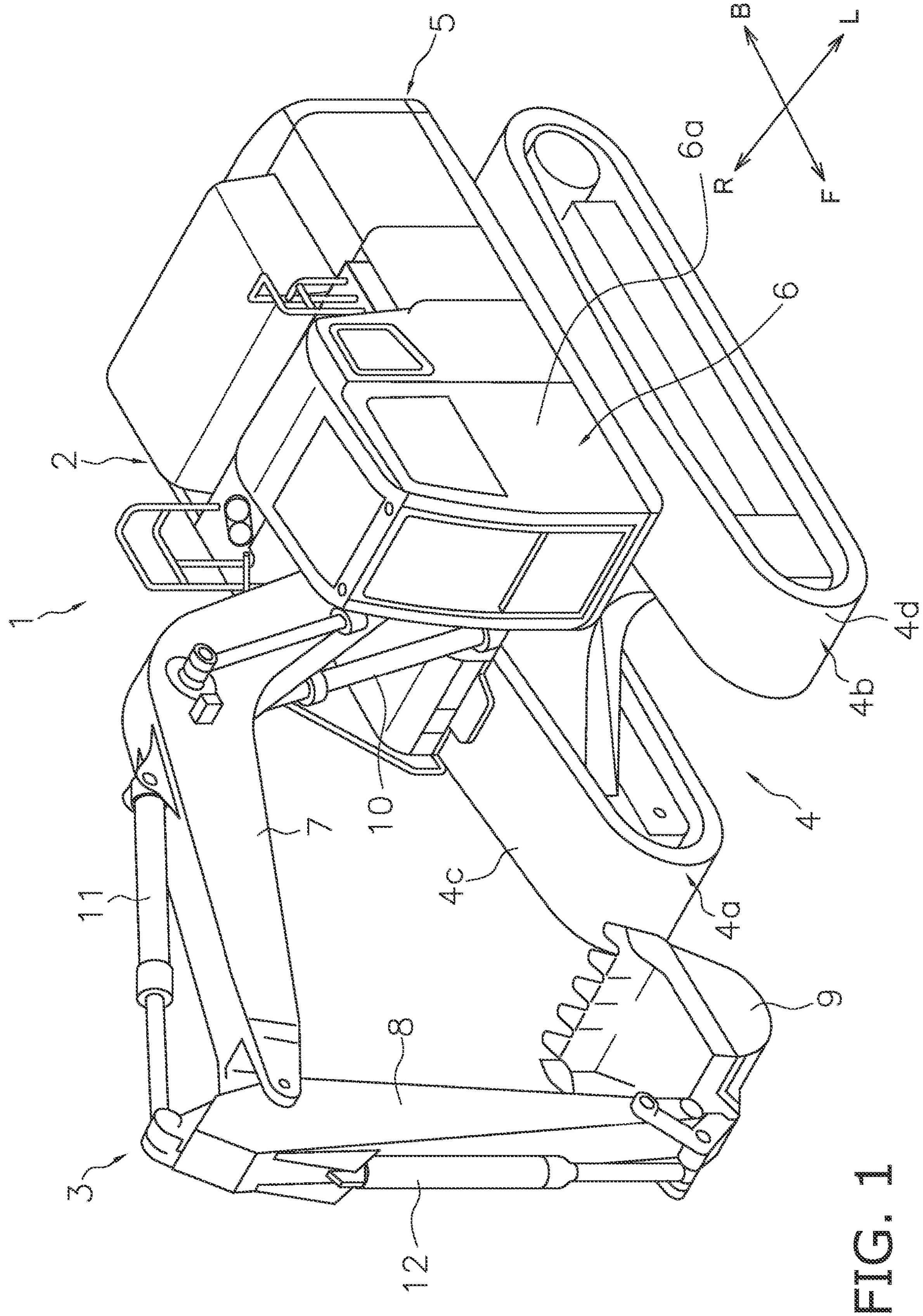
FIG. 1 is a perspective view of the hydraulic excavator according to the first embodiment of the present disclosure.

FIG. 1 is a schematic view showing the configuration of the hydraulic excavator 1 of the present embodiment.

The hydraulic excavator 1 includes a vehicle main body 2 and a work implement 3. As shown in FIG. 1, the vehicle main body 2 includes a traveling unit 4 and a revolving unit 5. The traveling unit 4 includes a pair of traveling devices **4*a* and 4*b*. Each of the traveling devices 4*a* and 4*b* includes tracks 4*c* and 4*d*, and the hydraulic excavator 1 travels by driving the tracks 4*c* and 4*d*** with the driving force from the engine.

The revolving unit 5 is arranged on the traveling unit 4. The revolving unit 5 is provided so as to be revolvable with respect to the traveling unit 4 about an axis along the vertical direction by a revolving device (not shown).

A cab 6 as a driver's room is provided at a position on the left side of the front part of the revolving unit 5. The revolving unit 5 accommodates a hydraulic pump, an engine (not shown) and the like. Unless otherwise specified in the present embodiment, the front, back, left and right will be described with reference to the driver's seat in the cab 6. The direction in which the driver's seat faces the front is the front direction F, and the direction facing the front direction is the back direction B. The right side and the left side in the lateral direction when the driver's seat faces the front are the right direction R and the left direction L, respectively.

The cab 6 includes a door 6*a* on the left side surface arranged on the opposite side of the work implement 3.

The work implement 3 includes a boom 7, an arm 8, and an excavation bucket 9, and is attached to the front center position of the revolving unit 5. Specifically, the work implement 3 is located on the right side of the cab 6. The base end portion of the boom 7 is rotatably connected to the revolving unit 5. Further, the tip end portion of the boom 7 is rotatably connected to the base end portion of the arm 8. The tip of the arm 8 is rotatably connected to the excavation bucket 9. The excavation bucket 9 is attached to the arm 8 so that its opening can face the direction (backward) of the vehicle main body 2. A hydraulic excavator in which the excavation bucket 9 is attached in such a direction is called a backhoe. Further, hydraulic cylinders 10 to 12 (a boom cylinder 10, an arm cylinder 11 and a bucket cylinder 12) are arranged so as to correspond to the boom 7, the arm 8 and the excavation bucket 9, respectively. The work implement 3 is driven by driving these hydraulic cylinders 10 to 12. As a result, work such as excavation is performed.

Figure 7:
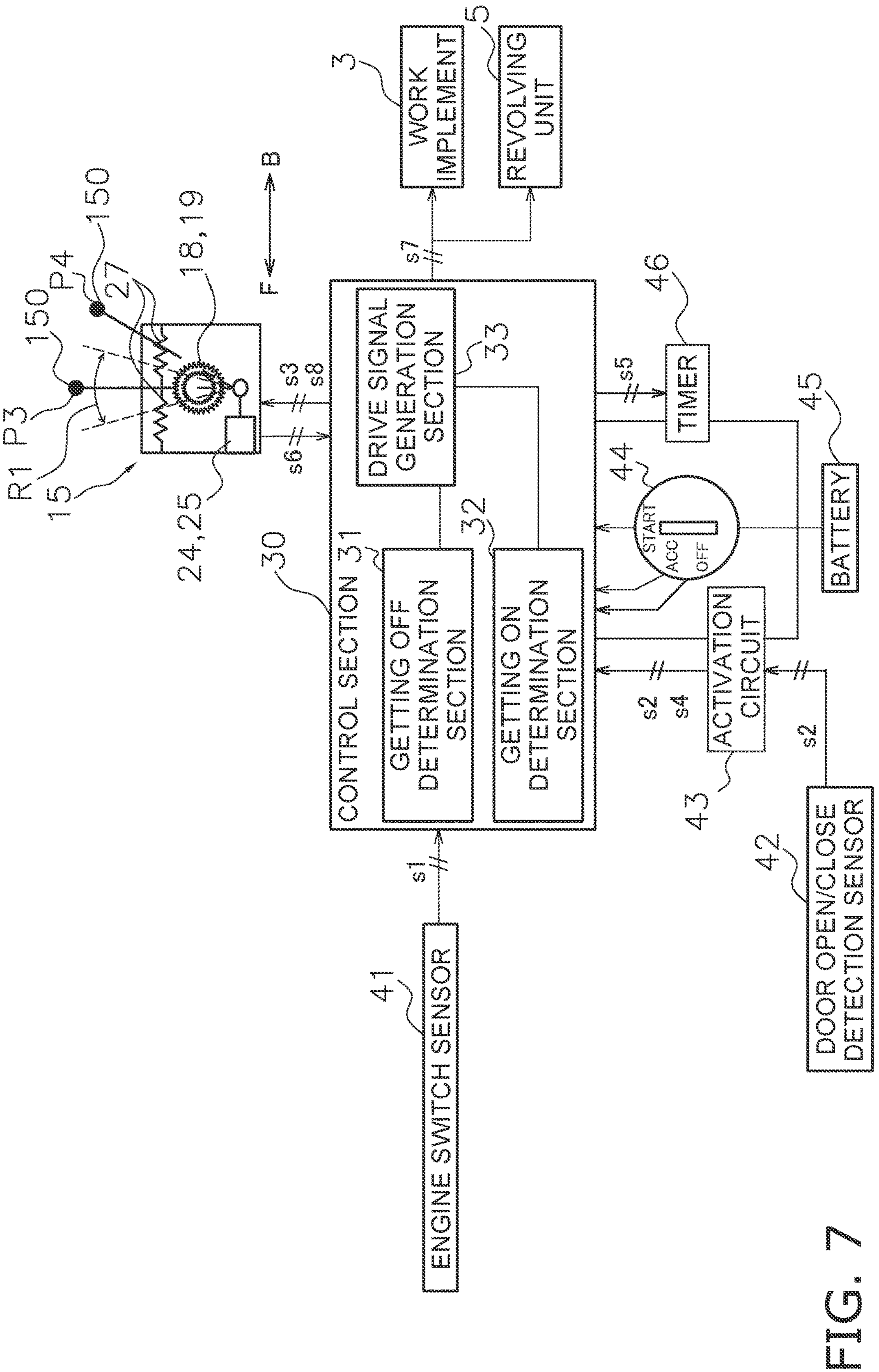
FIG. 7 is a block diagram showing a configuration relating to control of the hydraulic excavator on FIG. 1.

Further, the vehicle main body 2 is provided with a control section 30 as shown in FIG. 7, which will be described later. The control section 30 controls the work implement 3, the revolving unit 5, and the imparting section 17, which will be described later.

(Cab 6)

Figure 2:
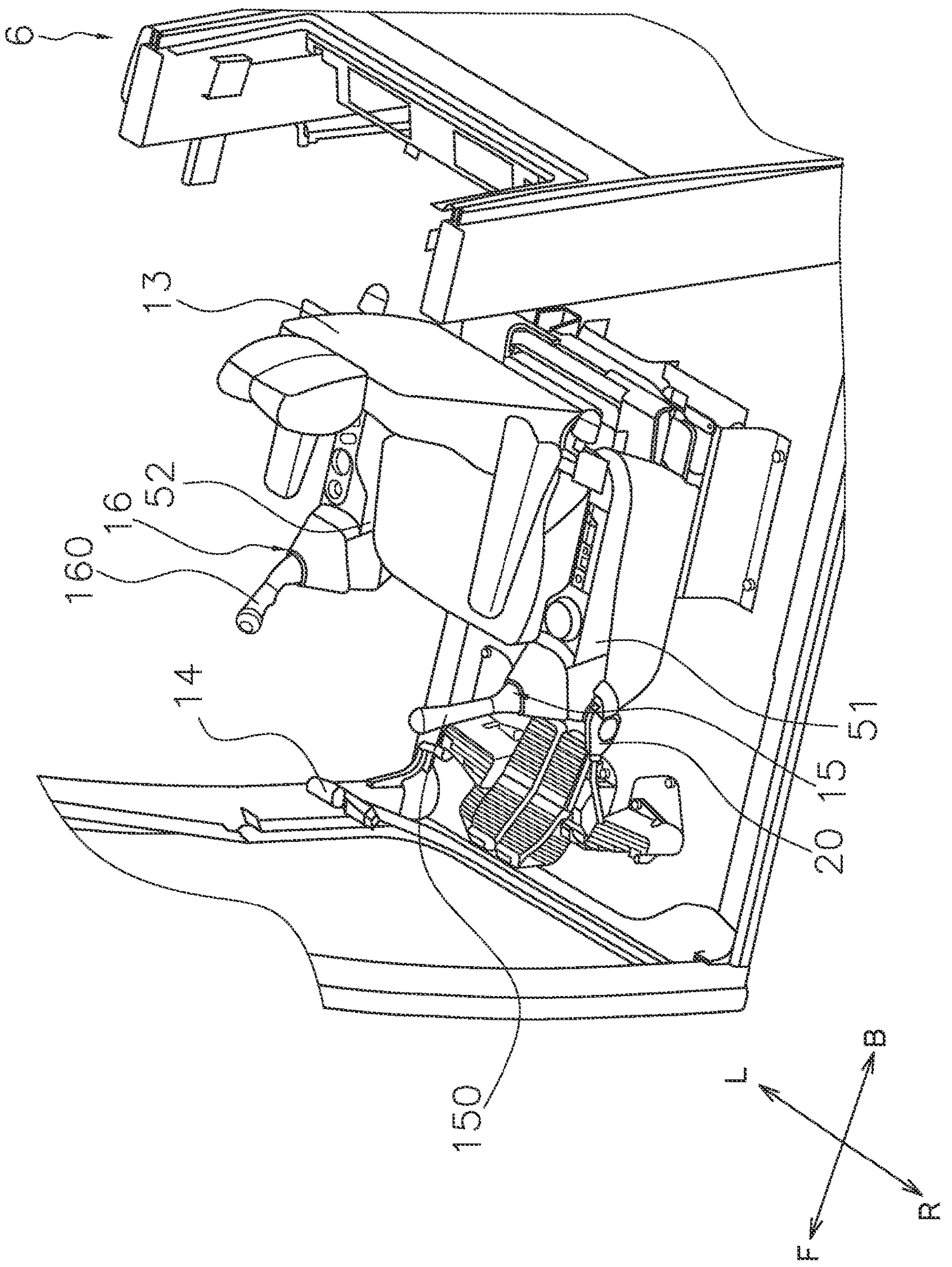
FIG. 2 is a perspective view showing the inside of a cab of the hydraulic excavator on FIG. 1.

FIG. 2 is a perspective view showing the inside of the cab 6.

A driver's seat 13, a traveling lever 14, a left work implement operating lever unit 15 (an example of an operating lever), and a right work implement operating lever unit 16 are provided in the cab 6.

The traveling lever 14 is arranged on the front side of the driver's seat 13. By pushing the traveling lever 14 forward, the vehicle main body 2 travels forward, and by pulling the traveling lever 14 toward an operator, the vehicle main body 2 travels backward.

The left work implement operating lever unit 15 is provided on the console box 51 arranged on the left side of the driver's seat 13. The left work implement operating lever 150 of the left work implement operating lever unit 15 can be tilted in four directions of front, back, left and right.

The arm 8 is pushed out by tilting the left work implement operating lever 150 forward, and the arm 8 is pulled in by tilting the left work implement operating lever 150 backward. Further, the revolving unit 5 revolves to the right by tilting the left work implement operating lever 150 toward the driver's seat 13 side, and the revolving unit 5 revolves to the left by tilting the left work implement operating lever 150 to the opposite side of the driver's seat 13. In the state where the left work implement operating lever 150 is arranged in the neutral position in the front, back, left and right, the revolving unit 5 and the arm 8 are held at that position while being stopped.

The right work implement operating lever unit 16 is provided on the console box 52 arranged on the right side of the driver's seat 13. The right work implement operating lever 160 of the right work implement operating lever unit 16 can be tilted in four directions, front, back, left and right.

The boom 7 is lowered by tilting the right work implement operating lever 160 forward, and the boom 7 is raised by tilting the right work implement operating lever 160 backward. The excavation bucket 9 dumps by tilting the right work implement operating lever 160 to the opposite side of the driver's seat 13, and the excavation bucket 9 operates excavation by tilting the right work implement operating lever 160 to the driver's seat 13 side. In the state where the right work implement operating lever 160 is arranged in the neutral position in the front, back, left and right, the boom 7 and the excavation bucket 9 do not move and are held at that position.

Figure 3:
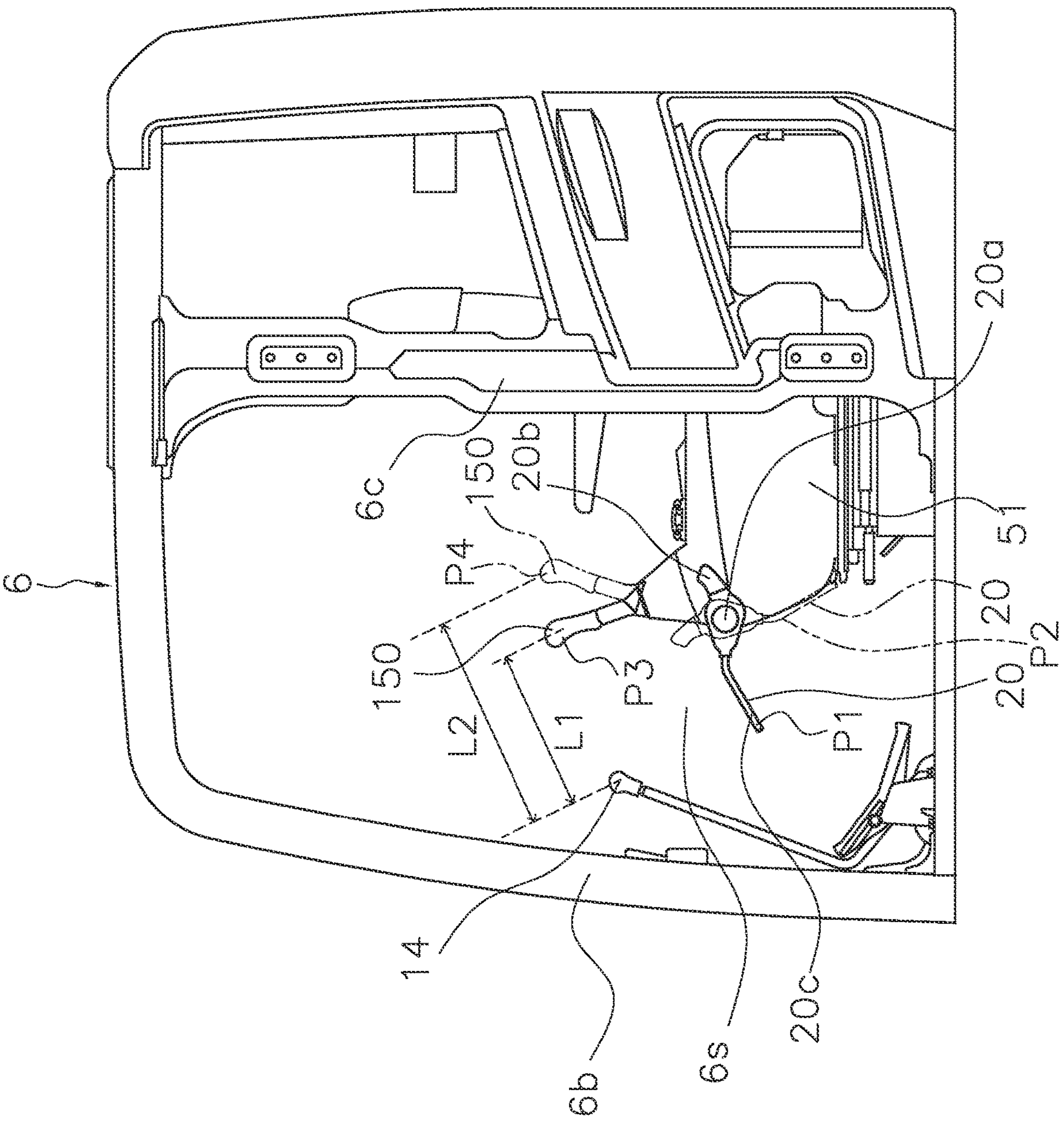
FIG. 3 is a side view of the cab on FIG. 1.

FIG. 3 is a side view of the cab 6. FIG. 3 shows a state in which the door 6*a* is removed. Among the frames surrounding the door 6*a* of the cab 6, the frame on the front side of the door 6*a* is indicated by 6*b*, and the frame on the back side of the door 6*a* is indicated by 6*c*. The door 6*a* can be opened and closed with the back side frame 6*c* as a fulcrum.

As shown in FIG. 3, between the traveling lever 14, and the console box 51 and the left work implement operating lever 150 provided on the upper part of the front end thereof, there is a passage space 6*s* for the operator to get on and off. A lock lever 20 is provided so as to be able to project into the passage space 6*s*. As shown in FIG. 3, the lock lever 20 is rotatably attached to the side surface of the console box 51. The lock lever 20 includes a rotation support part 20*a*, a grip part 20*b*, and a blocking bar 20*c*.

The rotation support part 20*a* is rotatably supported on the side surface of the console box 51. The grip part 20*b* protrudes from the rotation support part 20*a* and is a part to be gripped when the operator rotates the lock lever 20. The blocking bar 20*c* projects from the side opposite to the grip part 20*b* of the rotation support part 20*a*. The lock lever 20 is rotatable between a lock release position P1 in which the blocking bar 20*c* protrudes toward the passage space 6*s*, and a lock position in which the blocking bar 20*c* is retreated from the passage space 6*s* and arranged so as to extend downward along the console box 51. In FIG. 3, the lock release position is shown by a solid line, and the lock position P2 is shown by a two-dot chain line.

The lock position P2 is a position where the blocking bar 20*c* is retreated from the passage space 6*s* so that the operator can get off. At the locked position, in order that the left work implement operating lever 150 and so on is not operated by mistake, the pilot oil that operates the valve for operating the hydraulic cylinder flows into the oil storage tank, the valve cannot be operated, and the hydraulic excavator cannot be operated. At the lock release position P1, the pilot oil is supplied to the valve, the valve becomes operable, and the hydraulic excavator becomes operable.

In FIG. 3, the state in which the left work implement operating lever 150 described by the solid line is arranged at the neutral position P3 is shown. By moving the left work implement operating lever 150 to the retreat position P4 (two-dot chain line) behind the normal operating range, the distance from the traveling lever 14 increases from L1 to L2, making it easier for the operator to get on and off.

In the hydraulic excavator 1 of the present embodiment, by determining getting on or getting off, the left work implement operating lever 150 is automatically moved to the retreat position P4.

(Left Work Implement Operating Lever Unit 15 and the Right Work Implement Operating Lever Unit 16)

Since the left work implement operating lever unit 15 and the right work implement operating lever unit 16 include the same configuration, the left work implement operating lever unit 15 will be described as an example.

Figure 4:
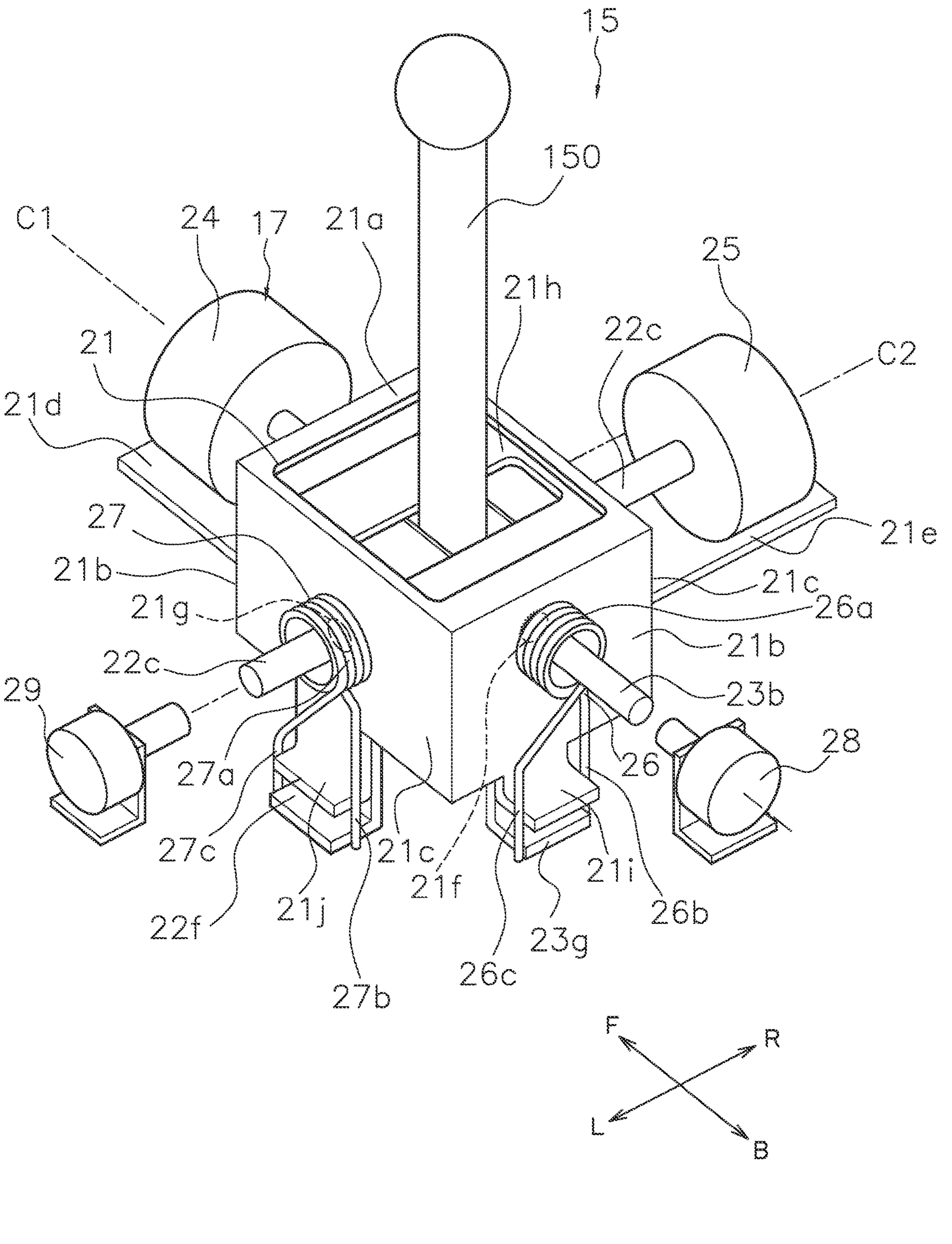
FIG. 4 is an external perspective view showing a left work implement operating lever unit on FIG. 3.
Figure 5:
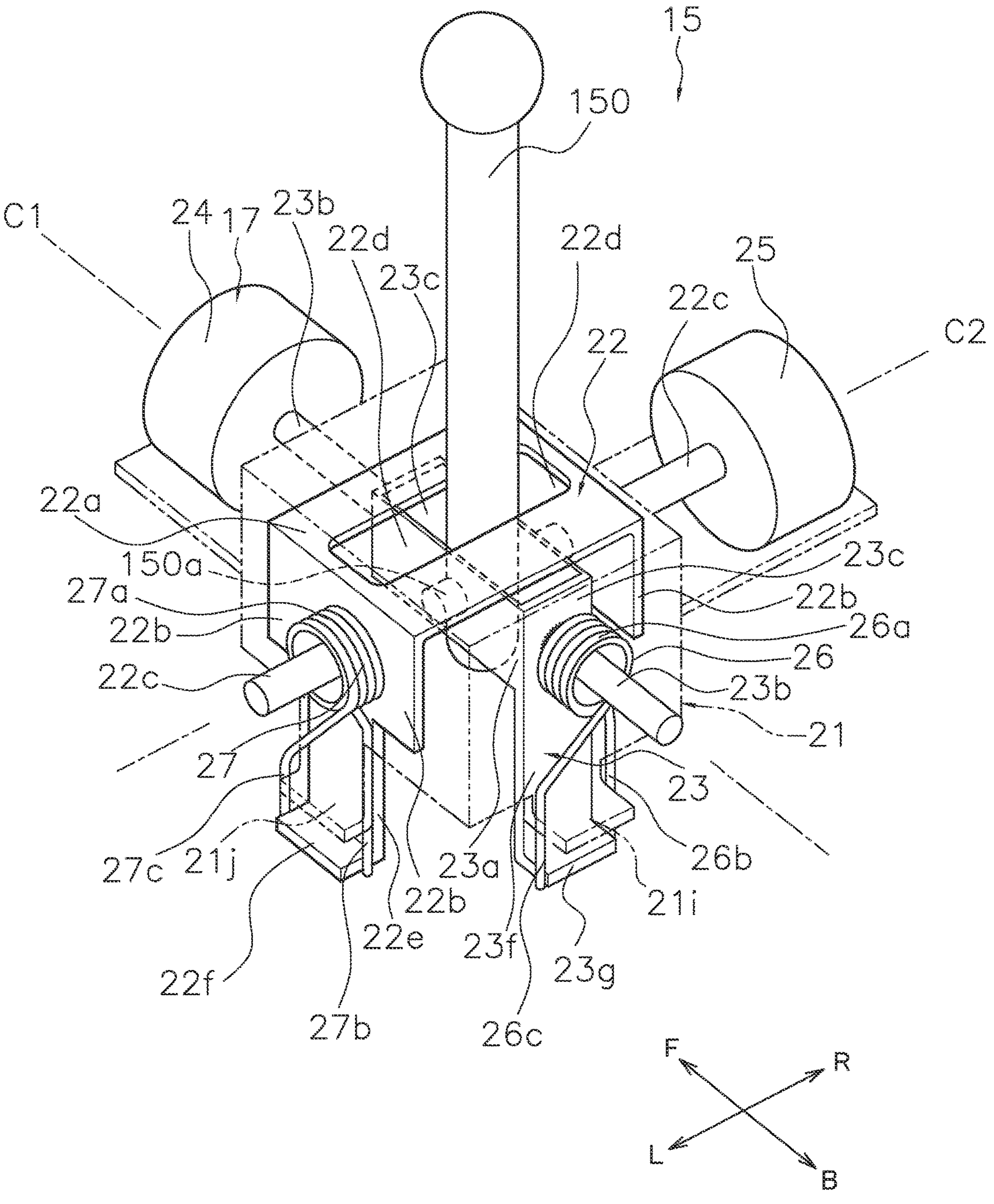
FIG. 5 is a perspective view schematically showing an internal configuration of the left work implement operating lever unit on FIG. 4.
Figure 6:
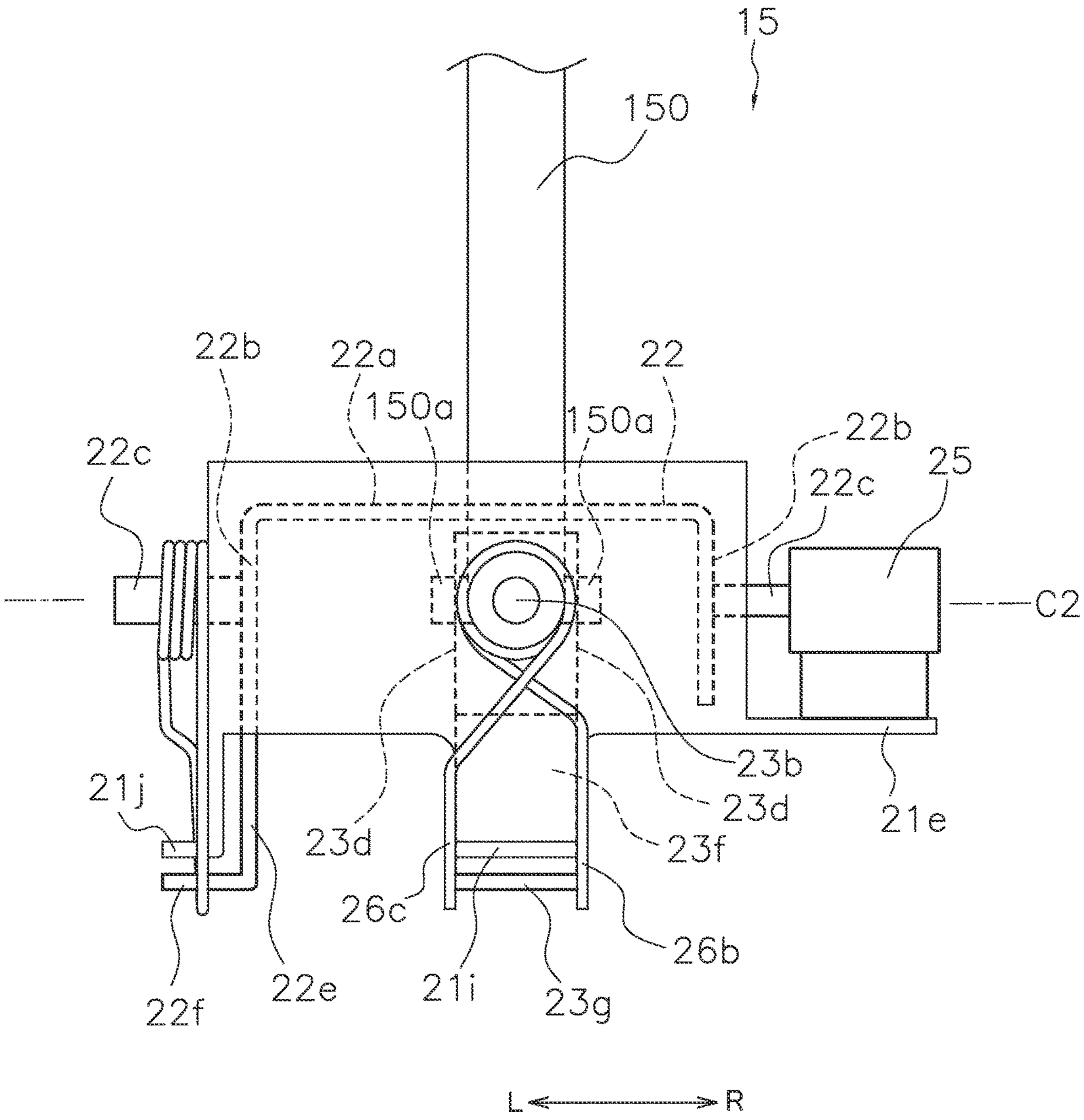
FIG. 6 is a side view of FIG. 4.

FIG. 4 is a perspective view schematically showing the appearance configuration of the left work implement operating lever unit 15. FIG. 5 is a perspective view schematically showing the internal configuration of the left work implement operating lever unit 15. FIG. 6 is a side view of FIG. 4.

As shown in FIG. 5, the left work implement operating lever unit 15 includes a first support frame 21, a second support frame 22, a third support frame 23, a imparting section 17, a first neutral spring 26, a second neutral spring 27 (an example of a first urging member), a first potentiometer 28 (see FIG. 4), and a second potentiometer 29 (see FIG. 4). In FIGS. 5 and 6, the first potentiometer 28 and the second potentiometer 29 are omitted.

(First Support Frame 21)

The first support frame 21 is fixed to the frame of the console box 51, and supports the left work implement operating lever 150 so as to be tiltable back and forth and left and right via the second support frame 22 and the third support frame 23.

For example, as shown in FIG. 4, the first support frame 21 includes a box shape, and includes an upper surface 21*a*, a pair of side surfaces 21*b*, a pair of side surfaces 21*c*, arrangement surfaces 21*d* and 21*e*, and locking parts 21*i* and 21*j*.

A square shape through hole 21*h* is formed on the upper surface 21*a* in a plan view.

The pair of side surfaces 21*b* are provided so as to face downward from each of the front end and the back end of the upper surface 21*a*. The pair of side surfaces 21*b* are arranged so as to face each other in the front-back direction. Through holes 21*f* are formed in each of the pair of side surfaces 21*b*. FIG. 4 shows only one through hole 21*f*.

The pair of side surfaces 21*c* are provided so as to face downward from each of the left end and the right end of the upper surface 21*a*. The pair of side surfaces 21*c* are arranged so as to face each other in the left-right direction. Through holes 21*g* are formed in each of the pair of side surfaces 21*c*. FIG. 4 shows only one through hole 21 *g*.

A box shape is formed by an upper surface 21*a*, a pair of side surfaces 21*b*, and a pair of side surfaces 21*c*.

The arrangement surface 21*d* is provided so as to be perpendicular to the side surface 21*b* and extend outward from one lower end of the pair of side surfaces 21*b*. A first motor 24, which will be described later, is arranged on the arrangement surface 21*d*.

The locking part 21*i* is provided so as to be perpendicular to the side surface 21*b* and extend outward from the other lower end of the pair of side surfaces 21*b*. The first neutral spring 26, which will be described later, is locked to the locking part 21*i*.

The arrangement surface 21*e* is provided so as to be perpendicular to the side surface 21*c* and extend outward from one lower end of the pair of side surfaces 21*c*. The second motor 25, which will be described later, is arranged on the arrangement surface 21*e*.

The locking part 21*j* is provided so as to be perpendicular to the side surface 21*c* and extend outward from the other lower end of the pair of side surfaces 21*c*. The second neutral spring 27, which will be described later, locks the locking part 21*j*.

(Second Support Frame 22)

In FIG. 5, the first support frame 21 is shown by a two-dot chain line, and the configuration inside the first support frame 21 is shown by a solid line.

The second support frame 22 is tilted according to the tilt of the left work implement operating lever 150 in the front-back direction. The second support frame 22 does not rotate with respect to the tilt of the left work implement operating lever 150 in the left-right direction, and supports the tilt of the left work implement operating lever 150 in the left-right direction.

The second support frame 22 is rotatably arranged inside the first support frame 21 with respect to the first support frame 21. As shown in FIG. 6, the second support frame 22 is formed in an inverted U shape when viewed along the front-back direction.

The second support frame 22 includes an upper surface 22*a*, a pair of side surfaces 22*b*, and a pair of shafts 22*c*, an extension part 22*e*, and a locking part 22*f*. The pair of side surfaces 22*b* are provided so as to face each other in the left-right direction. The pair of side surfaces 22*b* are formed so as to face downward from the left and right ends of the upper surface 22*a*.

The extension part 22*e* extends downward from the lower end of one side surface 22*b* (left side in the figure) of the pair of side surface 22*b*. The lower end of the extension part 22*e* is located below the locking part 21*j* of the first support frame 21.

The locking part 22*f* is provided so as to be perpendicular to the extension part 22*e* and extend outward from the lower end of the extension part 22*e*. The locking part 22*f* is located below the locking part 21*j* and is provided substantially parallel to the locking part 21*j*. A second neutral spring 27, which will be described later, locks the locking part 22*f*.

The other side surface 22*b* is formed so as to face downward from the end of the right side of the upper surface 22*a*.

The upper surface 22*a* is provided with a through hole 22*d* formed along the left-right direction. Further, the width of the through hole 22*d* in the front-back direction is set to be substantially the same as the diameter of the left work implement operating lever 150. The left work implement operating lever 150 tilts in the left-right direction along the through hole 22*d*.

The shaft 22*c* is provided on each of the pair of side surfaces 22*b* along the left-right direction so as to project outward. The shaft 22*c* on the left side surface 22*b* is provided from the left side surface 22*b* toward the left, and the shaft 22*c* on the right side surface 22*b* is provided from the right side surface 22*b* toward the right. The pair of shafts 22*c* are rotatably inserted into through holes 21*g* (see FIG. 4) formed in each of the pair of side surfaces 21*c*.

(Third Support Frame 23)

The third support frame 23 rotates according to the tilt of the left work implement operating lever 150 in the left-right direction. The third support frame 23 does not rotate with respect to the tilt of the left work implement operating lever 150 in the front-back direction, and supports the rotation of the left work implement operating lever 150.

The third support frame 23 is rotatably arranged inside the first support frame 21 with respect to the first support frame 21. The third support frame 23 is arranged inside the second support frame 22.

As shown in FIG. 5, the third support frame 23 includes a frame part 23*a*, a pair of shafts 23*b*, an extension part 23*f*, and a locking part 23*g*.

The frame part 23*a* includes a rectangular shape formed long in the front-back direction in a plan view. The frame part 23*a* surrounds the left work implement operating lever 150 in a plan view. The left work implement operating lever 150 is tilted along the front-back direction of the frame part 23*a*. The frame part 23*a* includes a pair of side surfaces 23*c* and a pair of side surfaces 23*d* (see FIG. 6). The pair of side surfaces 23*c* are arranged so as to face each other in the front-back direction. The pair of side surfaces 23*d* are arranged so as to face each other in the left-right direction. The side surface 23*d* is formed longer than the side surface 23*c* in a plan view. Through holes are formed in each of the pair of side surfaces 23*d*, and the left work implement operating lever 150 is rotatably inserted.

The shaft 23*b* is provided on each of the pair of side surfaces 23*d* along the front-back direction so as to project outward. The shaft 23*b* provided on the front side surface 23*c* is provided from the front side surface 23*c* toward the front, and the shaft 23*b* provided on the back side surface 23*c* faces the back direction from the back side surface 23*c*. The pair of shafts 23*b* are rotatably inserted into through holes 21*f* (see FIG. 4) formed in each of the pair of side surfaces 21*b*.

As shown in FIG. 6, the left work implement operating lever 150 includes a shaft 150*a* protruding in each of the left and right directions at its root part. Each of the shafts 150*a* is rotatably inserted into each through hole of the pair of side surfaces 23*d*. The shafts 150*a* and the pair of shafts 22*c* of the second support frame 22 described above are coaxially arranged (see axis C2). The pair of shafts 23*b* of the third support frame 23 are arranged coaxially (see axis C1).

As a result, for example, when the left work implement operating lever 150 is tilted in the front-back direction, the left work implement operating lever 150 rotates about the shafts 150*a* with respect to the third support frame 23. At this time, since the frame part 23*a* of the third support frame 23 is formed long in the front-back direction, the left work implement operating lever 150 can be tilted in the front-back direction without interfering with the frame part 23*a*.

On the other hand, since the left work implement operating lever 150 abuts on the edge of the through hole 22*d*, the second support frame 22 rotates about the shafts 22*c* as the left work implement operating lever 150 rotates in the front-back direction. Since the pair of shafts 22*c* of the second support frame 22 described above and the shafts 150*a* are arranged on the coaxial C2, the left work implement operating lever 150 is tilted about the axis C2 in the front-back direction.

Further, when the left work implement operating lever 150 is tilted in the left-right direction, the left work implement operating lever 150 rotates about the shafts 23*b* together with the third support frame 23. When the left work implement operating lever 150 is tilted in the left-right direction, the left work implement operating lever 150 moves along the through hole 22*d* of the second support frame 22, so that the left work implement operating lever 150 can be tilted in the left-right direction without interfering with the upper surface 22*a* of the second support frame 22. Since the pair of shafts 23*b* of the third support frame 23 are arranged on the coaxial C1, the left work implement operating lever 150 is tilted about the axis C1 in the left-right direction.

(Imparting Section 17)

When the left work implement operating lever 150 is operated by the operator, the imparting section 17 imparts reaction force to the left work implement operating lever 150 to give a feeling of operation.

The imparting section 17 includes a first motor 24 and a second motor 25.

(First Motor 24)

The first motor 24 is an electric motor and is connected to one of the pair of shafts 23*b* of the third support frame 23. The first motor 24 is fixed to the arrangement surface 21*d*.

The first motor 24 can impart force to the left work implement operating lever 150 so as to tilt in the left-right direction by imparting force to the shaft 23*b*.

In normal operation, the first motor 24 can impart reaction force to the left work implement operating lever 150 and the right work implement operating lever 160 with respect to the operator's operation in order to make the operator feel the operation feeling of the lever. For example, when the operator tilts the left work implement operating lever 150 to the left, the operator can be given a feeling of operation by imparting force to the shaft 23*b* so that the left work implement operating lever 150 tilts to the right.

(Second Motor 25)

The second motor 25 (an example of an actuator) is an electric motor, and is connected to one of the pair of shafts 22*c* of the second support frame 22. The second motor 25 is fixed to the arrangement surface 21*e*.

The second motor 25 can impart force to the left work implement operating lever 150 so as to tilt in the front-back direction by imparting force to the shaft 22*c*. When the second motor 25 is rotated, the second support frame 22 rotates in the front-back direction, and the edge of the through hole 22*d* abuts on the left work implement operating lever 150, so that the left work implement operating lever 150 also tilts in the front-back direction.

The second motor 25 can impart reaction force to the left work implement operating lever 150 and the right work implement operating lever 160 with respect to the operator's operation in order to make the operator feel the operation feeling of the lever. For example, when the operator tilts the left work implement operating lever 150 in the forward direction, the operator can be given a feeling of operation by imparting force to the shaft 22*c* so that the left work implement operating lever 150 tilts in the backward direction.

Further, when the operator gets on or off the cab 6, the left work implement operating lever 150 is automatically moved to the retreat position by imparting force to the shaft 22*c* with the second motor 25. Further, only the left work implement operating lever 150, which may interfere with the operator when getting on or getting off, may be moved to the retreat position, and the right work implement operating lever 160 may not be moved to the retreat position.

(First Neutral Spring 26)

The first neutral spring 26 urges the left work implement operating lever 150 so that the left work implement operating lever 150 is placed at the neutral position that is central in the left-right direction. The first neutral spring 26 is a coil spring and includes a coil part 26*a*, a first end part 26*b*, and a second end part 26*c*.

The coil part 26*a* is inserted into the shaft 23*b*. The first end part 26*b* and the second end part 26*c* are both end parts of the first neutral spring 26, and are provided so as to sandwich the locking part 21*i* and the locking part 23*g* from both sides. The first end part 26*b* extends downward from the coil part 26*a* and is in contact with the right ends of the locking part 21*i* and the locking part 23*g*. The second end part 26*c* extends downward to the left from the coil part 26*a* and is in contact with the left ends of the locking part 21*i* and the locking part 23*g*. The first neutral spring 26 is urged so as to close between the first end part 26*b* and the second end part 26*c*. The first neutral spring 26 urges the locking part 21*j* and the locking part 23*g* toward the left side with the first end part 26*b*, and urges the locking part 21*i* and the locking part 23*g* toward the right side with the second end part 26*c*.

As a result, reaction force is generated by the first neutral spring 26 when the third support frame 23 is rotated about the axis C1 with respect to the first support frame 21 by tilting the left work implement operating lever 150 to the left or right.

(Second Neutral Spring 27)

The second neutral spring 27 urges the left work implement operating lever 150 so that the left work implement operating lever 150 is placed at a neutral position that is central in the front-back direction. The second neutral spring 27 is a coil spring and includes a coil part 27*a*, a first end part 27*b*, and a second end part 27*c*.

The coil part 27*a* is inserted into the shaft 22*c*. The first end part 27*b* and the second end part 27*c* are both end parts of the second neutral spring 27, and are provided so as to sandwich the locking part 21*j* and the locking part 22*f* from both sides. The first end part 27*b* extends downward from the coil part 27*a* and is in contact with the back ends of the locking part 21*j* and the locking part 22*f*. The second end part 27*c* extends forward and downward from the coil part 27*a* and is in contact with the front ends of the locking part 21*j* and the locking part 22*f*. The second neutral spring 27 is urged to close between the first end part 27*b* and the second end part 27*c*. The second neutral spring 27 urges the locking part 21*j* and the locking part 22*f* toward the front side with the first end part 27*b*, and urges the locking part 21*j* and the locking part 22*f* with the second end part 27*c*.

As a result, reaction force is generated by the second neutral spring 27 when the second support frame 22 is rotated about the axis C2 with respect to the first support frame 21 by tilting the left work implement operating lever 150 to back and forth.

(First Potentiometer 28)

As shown in FIG. 4, the first potentiometer 28 is connected to a pair of shafts 23*b* of the third support frame 23. The first potentiometer 18 is fixed to the frame of the console box 51.

The first potentiometer 28 detects the tilted position of the left work implement operating lever 150 in the left-right direction by detecting the rotational position of the shaft 23*b*. A command signal is transmitted based on this tilted position, and the revolving unit 5 revolves.

(Second Potentiometer 29)

The second potentiometer 29 is connected to a pair of shafts 22*c* of the second support frame 22. The second potentiometer 29 is fixed to the frame of the console box 51.

The second potentiometer 29 detects the tilted position of the left work implement operating lever 150 in the front-back direction by detecting the rotational position of the shaft 22*c*. A command signal is transmitted based on this tilted position, and the arm 8 is pushed out or pulled in.

(Control Section 30)

FIG. 7 is a block diagram showing a configuration related to control. In FIG. 7, the first potentiometer 18 and the second potentiometer 19 are shown together. The first motor 24 and the second motor 25 are shown together. Moreover, only the second neutral spring 27 is shown.

The control section 30 includes a processor such as a CPU (Central Processing Unit) and a memory. The control section 30 expands the stored program on the memory and executes the program by the processor.

The control section 30 includes a getting off determination section 31, a getting on determination section 32, and a drive signal generation section 33. The getting on determination section 31, the getting off determination section 32, and the drive signal generation section 33 are executed by a program.

When the getting off determination section 31 receives a signal s1 including information to determine the operator's getting off, the getting off determination section 31 determines that the operator gets off. As the information to determine getting off, for example, as shown in FIG. 7, the information that the engine is turned off from the engine switch sensor 41 can be mentioned. That is, by receiving the information that the engine is turned off, the getting off determination section 31 determines that the operator gets off.

As the information to determine getting off, not only engine off information by the engine switch sensor 41, but also lock lever operation information, seatbelt sensor information, seating sensor information, door lock locking information, operator posture information, operating lever gripping information, or operator motion information may be used.

The lock lever operation information is information indicating that the lock lever 20 is operated to the lock position P2. The seatbelt sensor information is information indicating that the seatbelt of the driver's seat 13 is removed. The seating sensor information is information indicating that the operator leaves the seat by the seating sensor. The door lock locking information is door lock information using a radio wave key or a physical key detected by the door lock sensor in a state where the door lock sensor is provided. The operator posture information is information on the posture that the operator is about to get off, which is obtained by analyzing the image of the camera provided in the cab 6. The operating lever gripping information is information indicating that the operator releases the hand from the left work implement operating lever 150 by a pressure sensor in the state where the left work implement operating lever 150 is provided with the pressure sensor. The operator motion information is information on the motion that the operator is about to get off, which is obtained by analyzing the image of the camera provided in the cab 6.

Further, it may be determined that the operator gets off by appropriately combining the above-mentioned examples of information to determine getting off. For example, when both the engine off information and the operation information to the lock position of the lock lever 20 are received, the getting off determination section 31 may determine that the operator gets off.

When the getting on determination section 32 receives the signal s2 including the information to determine the operator's getting on, the getting on determination section 32 determines that the operator gets on. As the information to determine getting on, for example, door open/close information can be mentioned. The door open/close information is, for example, as shown in FIG. 7, information that the opening of the door 6*a* is detected by a door open/close detection sensor 42 in the state wherein the door open/close sensor is provided.

As the information to determine getting on, not only the door open/close information by the door open/close detection sensor 42, but also door lock release information, handrail gripping information, getting on step weight information, or operator detection information may be used.

The door lock release information is door lock release information using a radio wave key or a physical key detected by the door lock sensor in a state where the door lock sensor is provided. The handrail gripping information is information that a pressure sensor detects that the operator has gripped the handrail in a state wherein the pressure sensor is provided on the handrail (not shown) arranged in the cab 6. The getting on step weight information is information that a pressure sensor detects that the operator uses a step in a state wherein the pressure sensor is provided in the step (not shown) arranged for getting on or getting off the cab 6. The operator detection information is information that a motion sensor detects that the operator gets on in a state where the motion sensor is provided in the vicinity of the door 6*a* in the cab 6.

When the getting off determination section 31 receives the signal s1 including information to determine getting off and determines that the operator gets off, the drive signal generation section 33 generates a retreat command signal s3 for moving the left work implement operating lever 150 to the retreat position P4 and transmits the retreat command signal s3 to the second motor 25 of the imparting section 17. Further, when the getting on determination section 32 receives the signal s2 including information to determine getting on and determines that operator gets on, the drive signal generation section 33 generates the retreat command signal s3 for moving the left work implement operating lever 150 to the retreat position P4 and transmits the retreat command signal s3 to the second motor 25 of the imparting section 17. The second motor 25 drives the shaft 22*c* based on the retreat command signal s3, and moves the left work implement operating lever 150 to the backward retreat position P4. As shown in FIG. 7, it is preferable that the retreat position P4 is located behind the operating range R1 for operating the left work implement operating lever 150 back and forth.

Further, the drive signal generation section 33 detects the start of the engine and generates a neutral position command signal s8 for driving the second motor 25 so as to move the left work implement operating lever 150 from the retreat position P4 to the neutral position P3, and transmits the neutral position command signal s8 to the second motor 25.

Further, the activation circuit 43, the engine key unit 44, the battery 45, and the timer 46 are electrically connected to the control section 30.

The activation circuit 43 receives the signal s2 from the door open/close detection sensor 42 and transmits the activation command signal s4 to the control section 30. The control section 30 activates when receiving the activation command signal s4.

By rotating the key, the engine key unit 44 takes three positions: an engine start position, an ACC power on position, and an engine off position. The position information of the engine key unit 44 is transmitted to the control section 30. Further, when the engine key unit 44 takes the engine start position or the ACC power on position, electricity is supplied from the battery 45 to the control section 30. The battery 45 is electrically connected to the control section 30 via the engine key unit 44.

The timer 46 starts counting when receiving the count start signal s5 from the control section 30.

Further, the control section 30 is electrically connected to the first potentiometer 28 and the second potentiometer 29 provided in the left work implement operating lever unit 15 wirelessly or by wire. The control section 30 receives a signal s6 including the position information of the left work implement operating lever 150 from the first potentiometer 28 or the second potentiometer 29. Although not shown, the control section 30 is electrically connected to the first potentiometer 28 and the second potentiometer 29 provided in the right work implement operating lever unit 16 wirelessly or by wire, and receives a signal including the position information of the right work implement operating lever 160 is received from the first potentiometer 28 or the second potentiometer 29.

The control section 30 transmits a command signal s7 to drive the hydraulic cylinders 10 to 12 and to operate the work implement 3, and to revolve the revolving unit 5 based on the signal s6 including the position information of the left work implement operating lever 150 received from the first potentiometer 18 and the second potentiometer 19 and the signal including the position information of the right work implement operating lever 160 received from the first potentiometer 18 and the second potentiometer 19.

(Operation)

Hereinafter, the operation of the hydraulic excavator 1 according to the embodiment of the present disclosure will be described, and an example of the actuator automatic control method will also be described.

(Control Method at the Time of Getting on)

Figure 8:
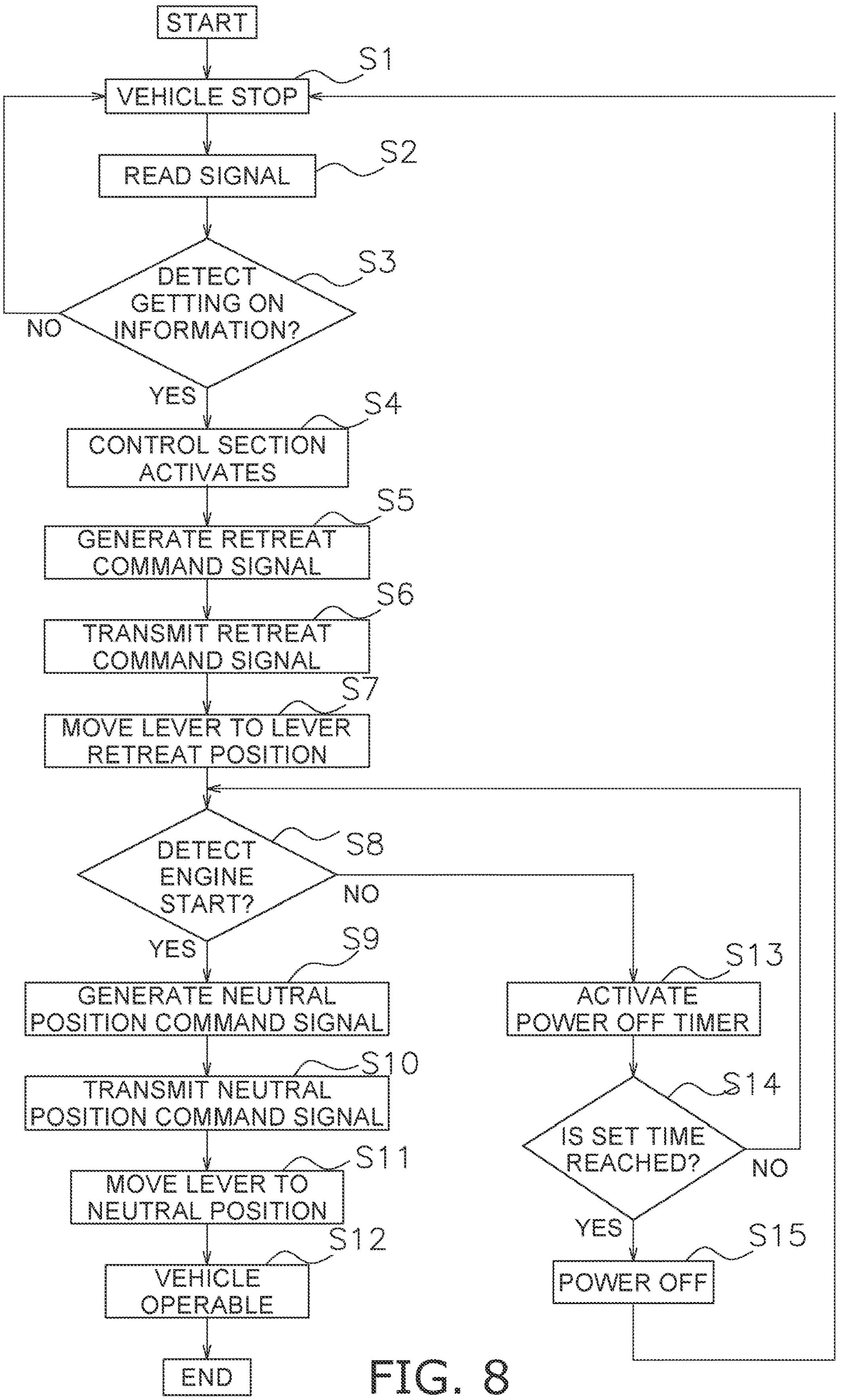
FIG. 8 is a flow chart showing a control method at the time of getting on the hydraulic excavator on FIG. 1.

FIG. 8 is a flow chart showing a method for controlling the hydraulic excavator 1 at the time of getting on.

First, in step S1, the hydraulic excavator 1 is in the stopped state.

Next, in step S2, the control section 30 reads signals of various detection results.

Next, in step S3, when the information to determine getting on is detected, in step S4, the activation command signal s4 is transmitted from the activation circuit 43 to activate the control section 30. Further, steps S1 and S2 are repeated in a standby state until information to determine getting on is received. Further, in the present embodiment, for example, the door opening detection by the door open/close detection sensor 42 is the detection of information to determine getting on.

Next, in step S5, when the getting on determination section 32 of the control section 30 receives the signal s2 including the information to determine getting on via the activation circuit 43, the getting on determination section 32 determines that the operator gets on, and the drive signal generation section 33 generates the retreat command signal s3. Next, in step S6, the drive signal generation section 33 transmits the retreat command signal s3 to the second motor 25. In step S7, the second motor 25 is driven based on the retreat command signal s3, and the left work implement operating lever 150 moves to the retreat position P4.

Next, in step S8, the control section 30 determines whether or not the engine start is detected by operating the engine key unit 44.

When the engine start is detected in step S8, it is determined that the operator has got on the driver's seat 13, and in step S9, the drive signal generation section 33 generates the neutral position command signal s8. Next, in step S10, the drive signal generation section 33 transmits the neutral position command signal s8 to the second motor 25. When the neutral position command signal s8 is transmitted in step S10, the second motor 25 moves the left work implement operating lever 150 to the neutral position P3 in step S11.

Next, in step S12, the hydraulic excavator 1 becomes operable, and the control ends.

On the other hand, when the engine start is not detected in step S8, the control proceeds to step S13, and in step S13, the control section 30 transmits a count start signal s5 to the timer 46, and the timer is operated in order to turn off the power after a predetermined time.

Next, when the count of the timer 46 reaches the set time in step S14, the power is turned off in step S15, and the control returns to step S1. On the other hand, when the count of the timer 46 does not reach the set time in step S14, it is determined whether or not the engine start in step S8 is detected. That is, when the engine is started before the timer 46 reaches the set time, the controls in steps S9 to S12 are performed, and when the count of the timer 46 reaches the set time, the power is turned off. As the result, it is possible to turn off the power when the door is only opened and the operation is not performed.

(Control Method at the Time of Getting Off)

Figure 9:
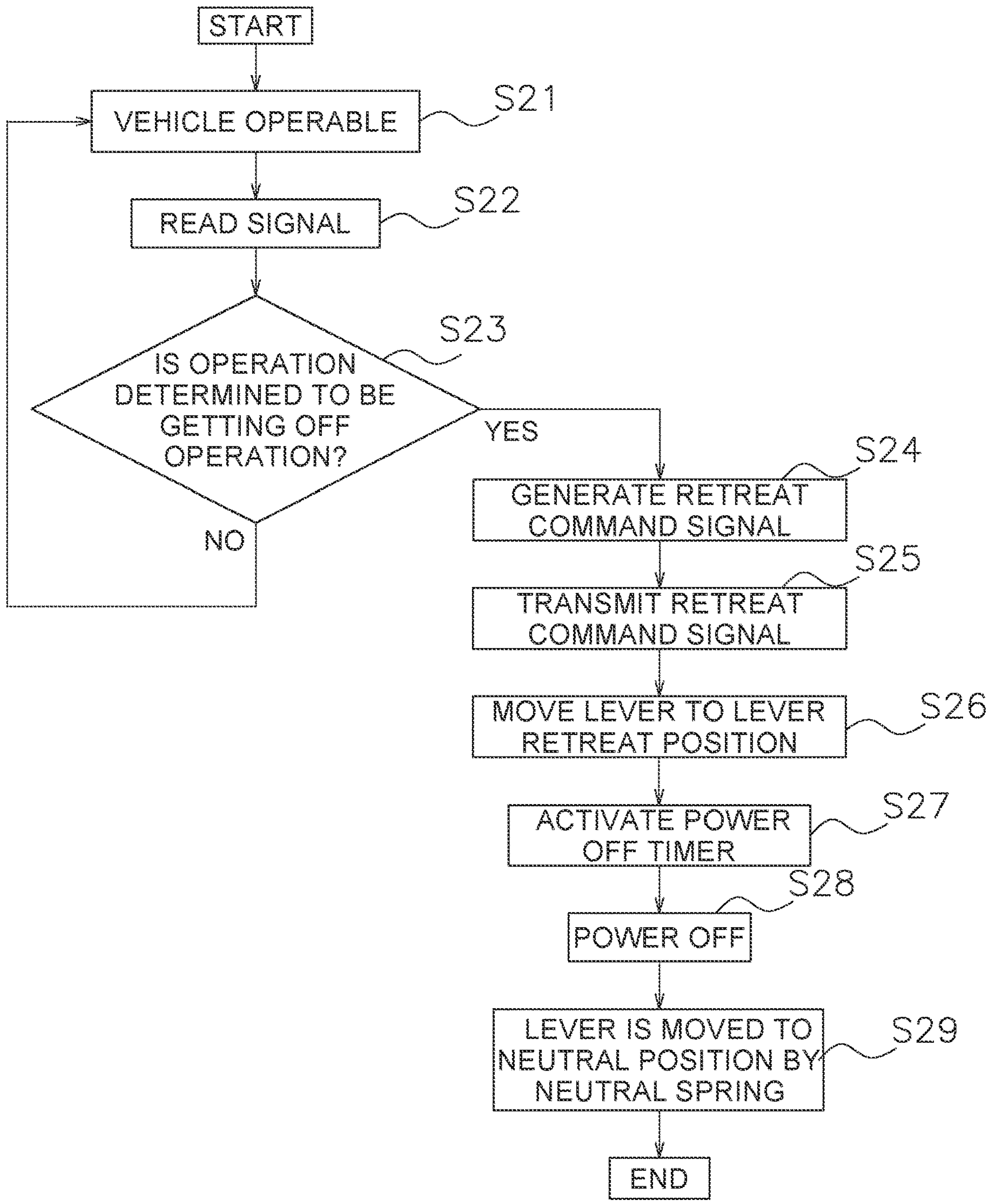
FIG. 9 is a flow chart showing a control method at the time of getting off the hydraulic excavator on FIG. 1.

FIG. 9 is a flow chart showing a method for controlling the hydraulic excavator 1 at the time of getting off.

First, in step S21, the hydraulic excavator 1 is operable.

Next, in step S22, the control section 30 reads signals of various detection results.

Next, in step S23, when the getting off determination section 31 of the control section 30 receives the signal s1 including information to determine getting off such as engine off information from the engine switch sensor 41, the getting off determination section 31 determines that the operator gets off. When the signal including the information to determine getting off is not received, steps S21 and S22 are repeated, and when the signal including the information to determine getting off is received, the control proceeds to step S24.

Next, in step S24, the drive signal generation section 33 generates the retreat command signal s3, and in step S25, the drive signal generation section 33 transmits the retreat command signal s3 to the second motor 25. Then, in step S26, the second motor 25 is driven based on the retreat command signal s3, and the left work implement operating lever 150 moves to the retreat position P4.

Next, in step S27, the control section 30 transmits the count start signal s5 to the timer 46, and the timer 46 operates in order to turn off the power.

Next, in step S28, when the timer 46 reaches the set time, the power is turned off.

Next, in step S29, since the power is turned off, the energization of the second motor 25 is also stopped, and the left work implement operating lever 150 moves to the neutral position in the front-back direction by the urging force of the second neutral spring 27.

As described above, the control at the time of getting off is performed.

Embodiment 2

Hereinafter, the hydraulic excavator of the second embodiment will be described below.

(Configuration)

The hydraulic excavator of the second embodiment includes different configurations of the left work implement operating lever unit and the control section from the first embodiment. Therefore, in the second embodiment, the differences from the first embodiment will be mainly described.

Figure 10:
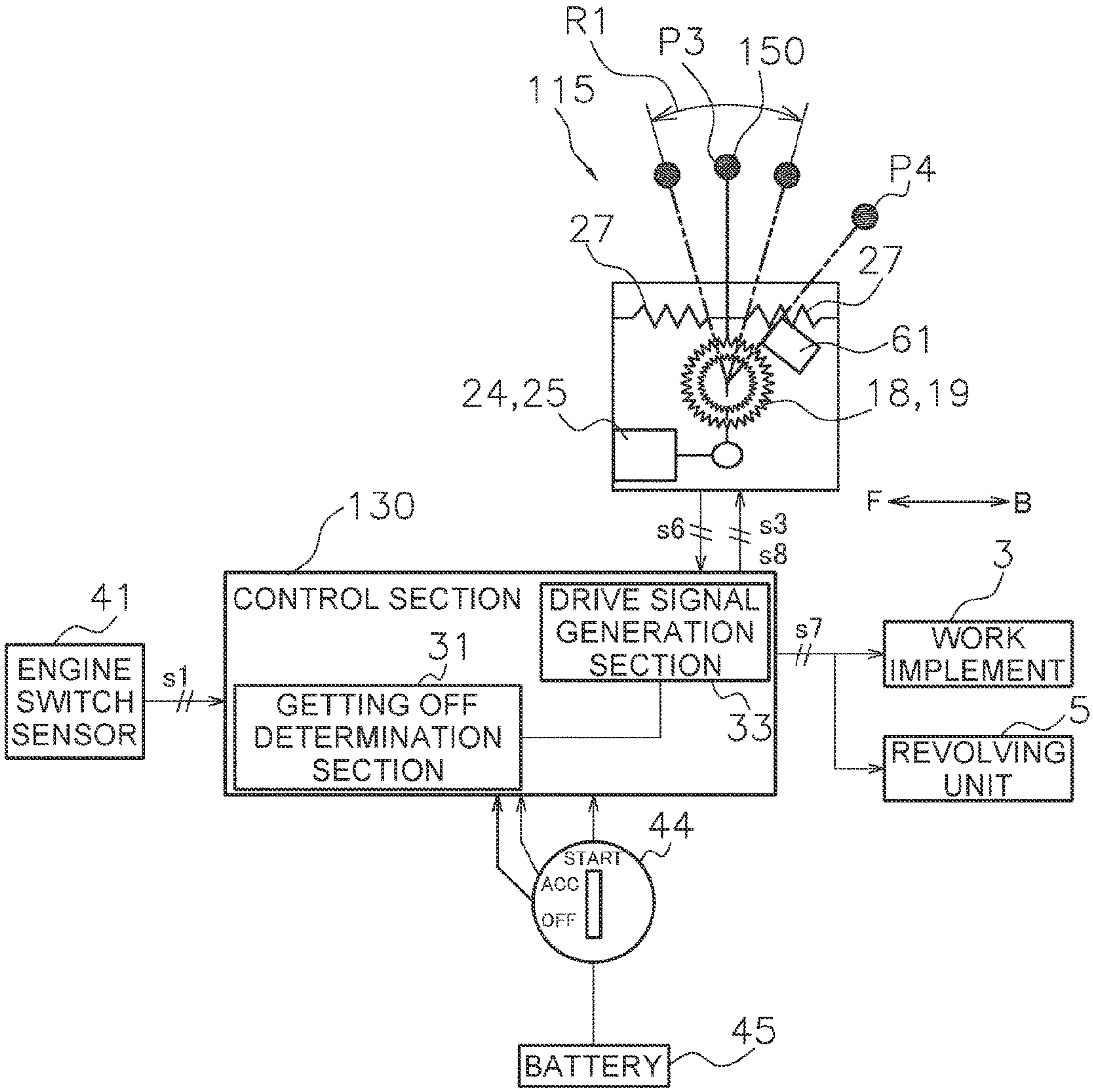
FIG. 10 is a block diagram showing a configuration relating to control of the hydraulic excavator of a second embodiment according to the present disclosure.

FIG. 10 is a diagram schematically showing the left work implement operating lever unit 115 of the second embodiment. Further, FIG. 10 also shows a block diagram showing the configuration of the control section 130.

The left work implement operating lever unit 115 of the second embodiment includes a holding part 61 for holding the left work implement operating lever 150 at the retreat position P4 as compared with the left work implement operating lever unit 15 of the first embodiment.

The holding part 61 may be, for example, a magnet and may be fixed to the inside of the back side surface 23*c* of the pair of side surfaces 23*c* of the third support frame 23.

In the left work implement operating lever unit 115 of the second embodiment, even when the energization to the second motor 25 is stopped after the left work implement operating lever 150 is moved to the retreat position P4, the left work implement is held by the holding part 61 against the urging force of the second neutral spring 27.

Further, the control section 130 of the second embodiment is not provided with the getting on determination section 32 as compared with the control section 30 of the first embodiment. Further, the hydraulic excavator 1 of the second embodiment is not provided with the door open/close detection sensor 42, the activation circuit 43, and the timer 46.

(Operation)

Next, the method for controlling the hydraulic excavator according to the second embodiment will be described, and an example of the actuator automatic control method will also be described.

(Control Method at the Time of Getting on)

Figure 11:
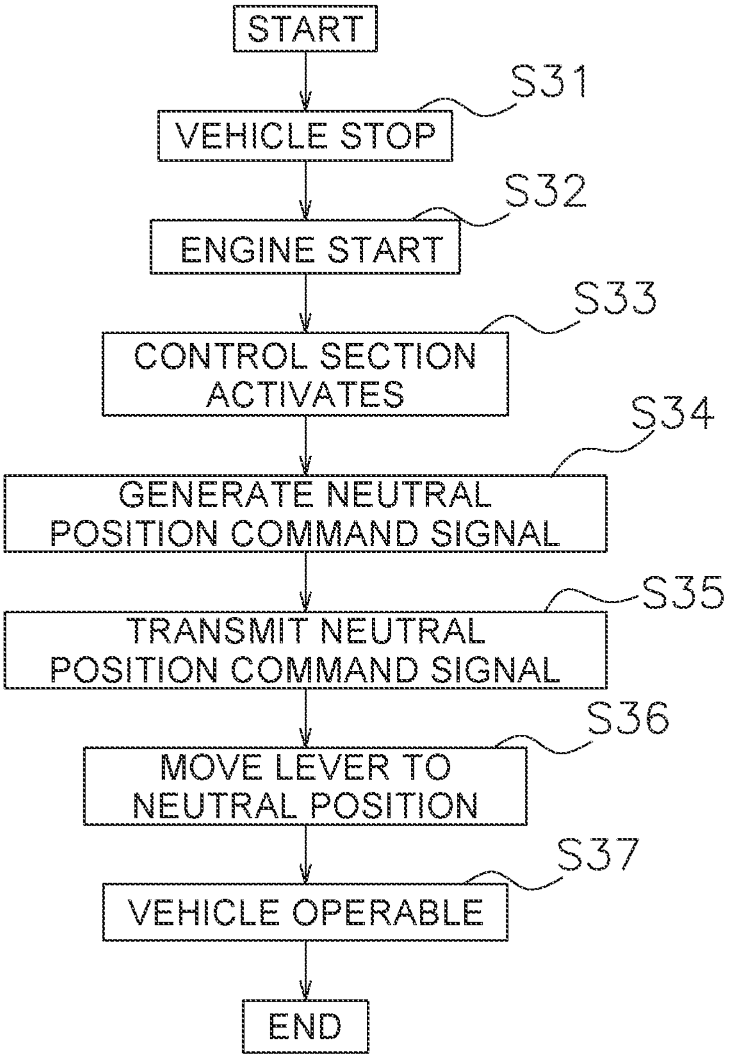
FIG. 11 is a flow chart showing a control method at the time of getting on the hydraulic excavator of the second embodiment according to the present disclosure.

FIG. 11 is a flow chart showing a method for controlling the hydraulic excavator 1 at the time of getting on.

First, in step S31, the hydraulic excavator 1 is in the stopped state.

Next, when the engine start is detected in step S32, power is supplied from the battery 45 to activate the control section 130 in step S33. In the second embodiment, since the left work implement operating lever 150 is held at the retreat position P4 by the holding part 61 in the stopped state of the vehicle, it is not necessary to move the left work implement operating lever 150 to the retreat position as in the first embodiment.

Next, in step S34, the drive signal generation section 33 creates the neutral position command signal s8, and in step S35, the drive signal generation section 33 transmits the neutral position command signal s8 to the second motor 25. Upon receiving the neutral position command signal s8, in step S36, the second motor 25 moves the left work implement operating lever 150 to the neutral position P3.

Next, in step S37, the hydraulic excavator 1 becomes operable, and the control ends.

(Control Method at the Time of Getting Off)

Figure 12:
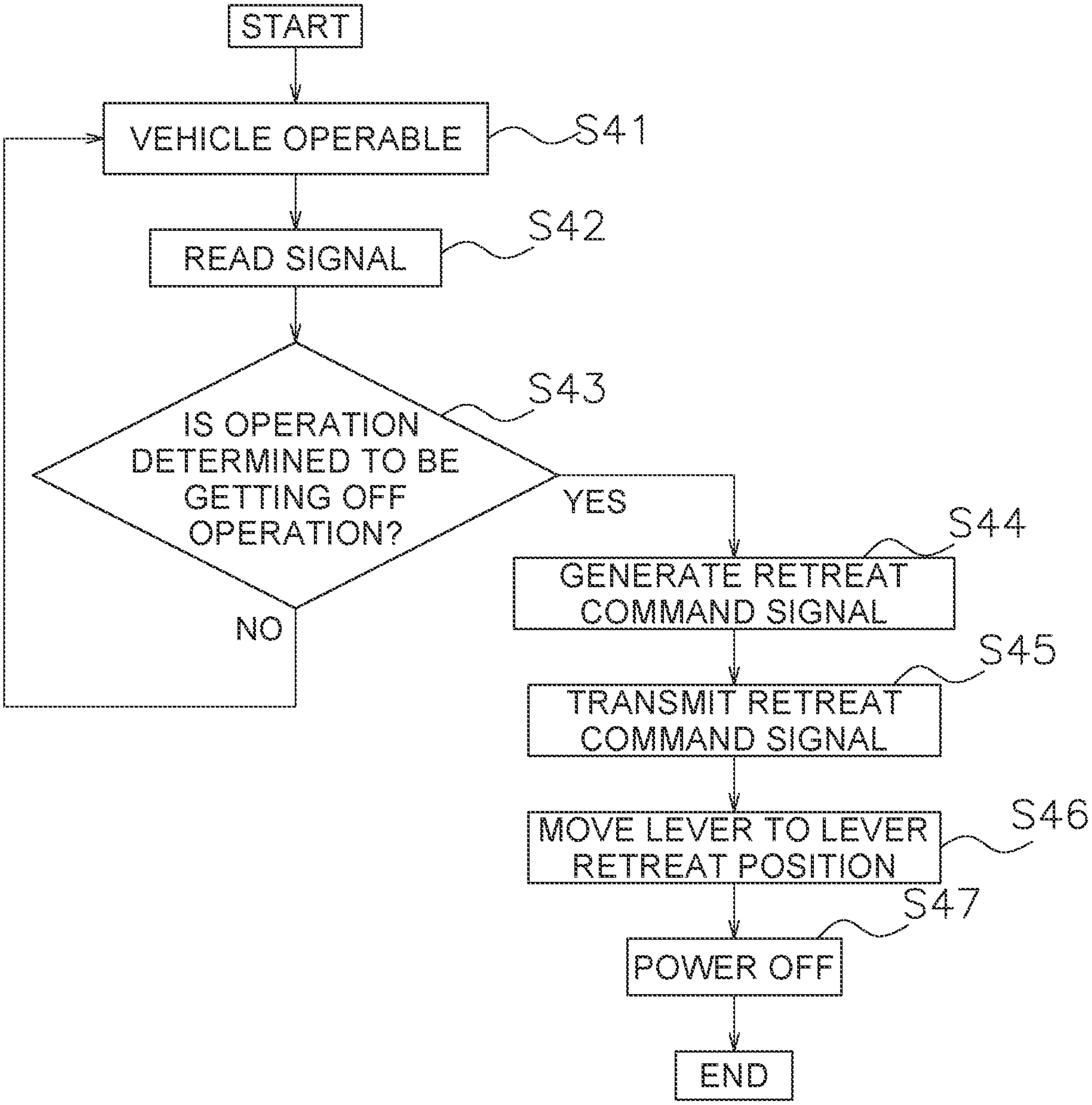
FIG. 12 is a flow chart showing a control method at the time of getting off the hydraulic excavator of the second embodiment according to the present disclosure.

FIG. 12 is a flow chart showing a method for controlling the hydraulic excavator 1 at the time of getting off.

First, in step S41, the hydraulic excavator 1 is operable.

Next, in step S42, the control section 130 reads signals of various detection results.

Next, in step S43, when the getting off determination section 31 of the control section 130 receives the signal s1 including information to determine getting off such as engine off information from the engine switch sensor 41, the getting off determination section 31 determines that the operator gets off. When the signal including the information to determine getting off is not received, steps S41 and S42 are repeated, and when the signal including the information to determine getting off is received, the control proceeds to step S44.

Next, in step S44, the drive signal generation section 33 generates the retreat command signal s3, and in step S45, the drive signal generation section 33 transmits the retreat command signal s3 to the second motor 25. Then, in step S46, the second motor 25 is driven based on the retreat command signal s3, and the left work implement operating lever 150 moves to the retreat position P4.

Next, in step S47, the power is turned off and the control ends. The left work implement operating lever 150 that has moved to the retreat position P4 is held by the holding part 61. Therefore, it is not necessary to move the left work implement operating lever 150 to the retreat position P4 at the next getting on.

Embodiment 3

Hereinafter, the hydraulic excavator of the third embodiment will be described below.

(Configuration)

The hydraulic excavator of the third embodiment includes different configurations of the left work implement operating lever unit and the control section from the first embodiment. Therefore, in the third embodiment, the differences from the first embodiment will be mainly described.

Figure 13:
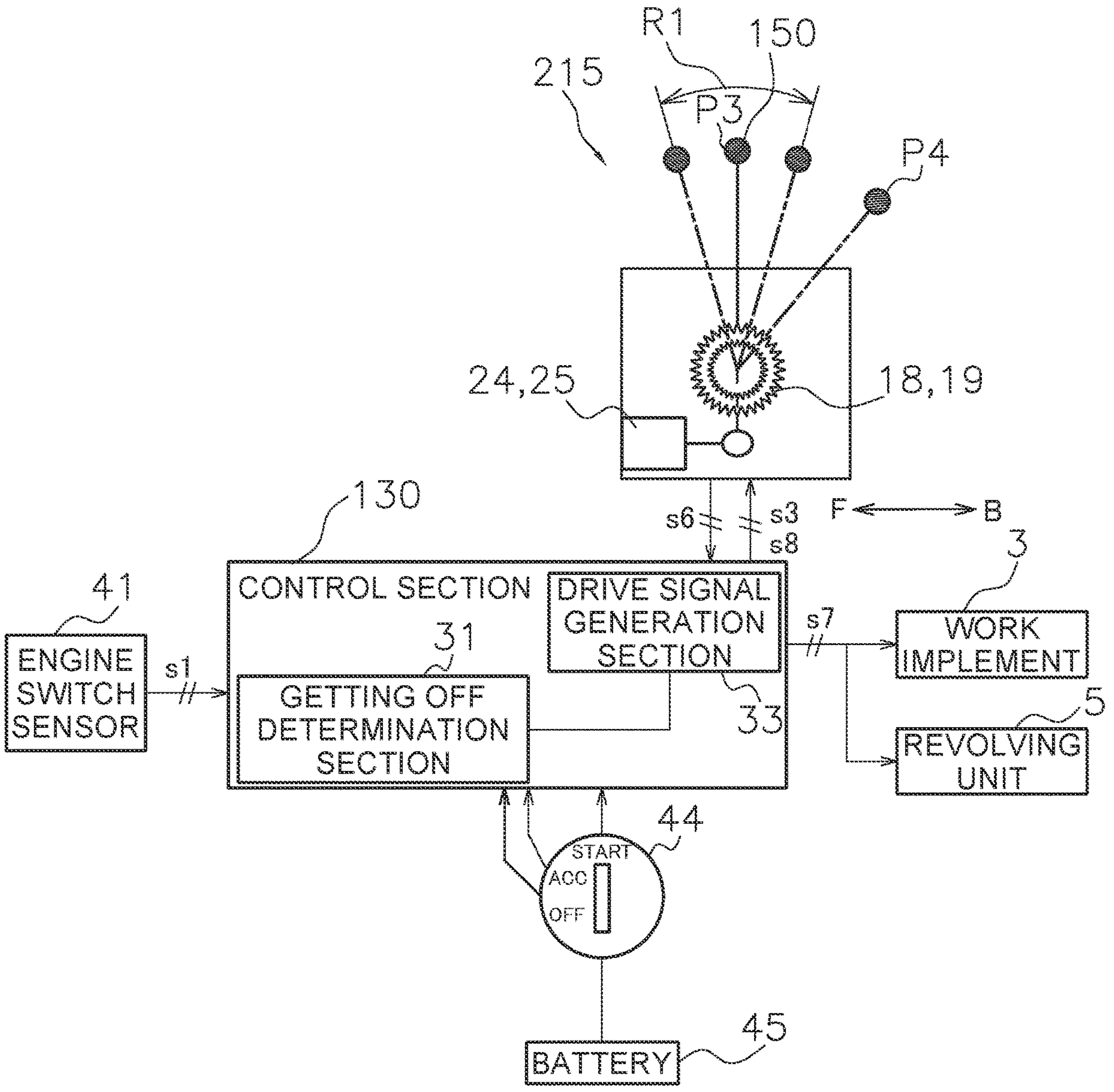
FIG. 13 is a block diagram showing a configuration relating to control of the hydraulic excavator of a third embodiment according to the present disclosure.

FIG. 13 is a diagram schematically showing the left work implement operating lever unit 215 of the third embodiment. Further, FIG. 13 also shows a block diagram showing the configuration of the control section 130.

As shown in FIG. 13, the left work implement operating lever unit 215 of the third embodiment is not provided with the first neutral spring 26 and the second neutral spring 27 as compared with the left work implement operating lever unit 15 of the first embodiment.

Further, the control section 130 of the third embodiment is the same as that of the second embodiment, and is not provided with the getting on determination section 32 as compared with the control section 30 of the first embodiment. Further, the hydraulic excavator 1 of the third embodiment is not provided with the door open/close detection sensor 42, the activation circuit 43, and the timer 46.

(Operation)

Next, the method for controlling the hydraulic excavator according to the third embodiment will be described, and an example of the actuator automatic control method will also be described. Since the flow showing the control method at the time of getting on and the flow showing the control method at the time of getting off of the third embodiment are the same as those of the second embodiment, they will be described with reference to FIGS. 11 and 12 of the second embodiment.

(Control Method at the Time of Getting on)

First, in step S31, the hydraulic excavator 1 is in the stopped state.

Next, when the engine start is detected in step S32, power is supplied from the battery 45 to activate the control section 130 in step S33. In the third embodiment, the left work implement operating lever 150 is moved to the retreat position P4 when the operator gets off, which will be described later, and is arranged at the retreat position P4 in the vehicle stopped state by its own weight. Therefore, it is not necessary to move the left work implement operating lever 150 to the retreat position P4 as in the first embodiment.

Next, in step S34, the drive signal generation section 33 of the control section 130 creates the neutral position command signal s8, and in step S35, the drive signal generation section 33 transmits the neutral position command signal s8 to the second motor 25. Upon receiving the neutral position command signal s8, in step S36, the second motor 25 moves the left work implement operating lever 150 to the neutral position P3.

Next, in step S37, the hydraulic excavator 1 becomes operable, and the control ends.

(Control Method at the Time of Getting Off)

First, in step S41, the hydraulic excavator 1 is operable.

Next, in step S42, the control section 130 reads signals of various detection results.

Next, in step S43, when the getting off determination section 31 of the control section 130 receives the signal s1 including information to determine getting off such as engine off information from the engine switch sensor 41, the getting off determination section 31 determines that the operator gets off. When the signal including the information to determine getting off is not received, steps S41 and S42 are repeated, and when the signal including the information to determine getting off is received, the control proceeds to step S44.

Next, in step S44, the drive signal generation section 33 generates the retreat command signal s3, and in step S45, the drive signal generation section 33 transmits the retreat command signal s3 to the second motor 25. Then, in step S46, the second motor 25 is driven based on the retreat command signal s3, and the left work implement operating lever 150 moves to the retreat position P4.

Next, in step S47, the power is turned off and the control ends. The left work implement operating lever 150 that has moved to the retreat position P4 is in a state of being arranged at the retreat position P4 due to its own weight. Therefore, it is not necessary to move the left work implement operating lever 150 to the retreat position P4 at the next getting on.

Embodiment 4

Hereinafter, the hydraulic excavator of the fourth embodiment will be described below.

(Configuration)

The hydraulic excavator of the fourth embodiment has different configurations of the left work implement operating lever unit and the control section from the first embodiment. Therefore, in the fourth embodiment, the differences from the first embodiment will be mainly described.

Figure 14:
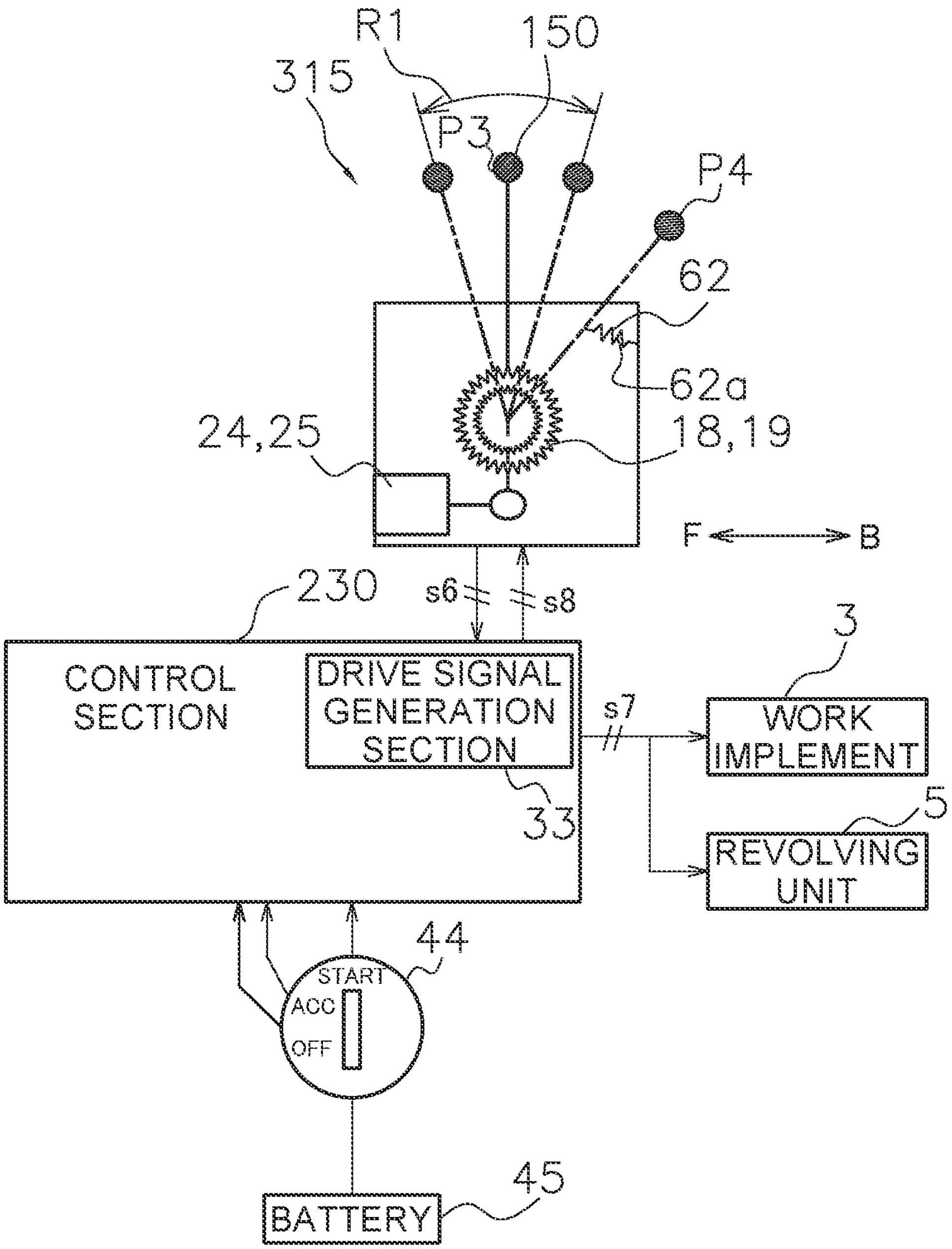
FIG. 14 is a block diagram showing a configuration relating to control of the hydraulic excavator according to the fourth embodiment according to the present disclosure.

FIG. 14 is a diagram schematically showing the left work implement operating lever unit 315 of the fourth embodiment. Further, FIG. 14 also shows a block diagram showing the configuration of the control section 230.

As shown in FIG. 14, the left work implement operating lever unit 315 of the fourth embodiment is not provided with the first neutral spring 26 and the second neutral spring 27 as compared with the left work implement operating lever unit 15 of the first embodiment and is provided with a holding part 62 for holding the left work implement operating lever 150 at the retreat position P4. The holding part 62 includes a tilting spring 62*a* (an example of a second urging member) that urges the left work implement operating lever 150 to the retreat position P4. The tilting spring 62*a* urges the left work implement operating lever 150 toward the backward retreat position P4. For example, the tilting spring 62*a* can be arranged so that one end is connected to the inside of the back side surface 23*c* of the pair of side surfaces 23*c* of the third support frame 23 and the other end is connected to the left work implement operating lever 150.

Further, the control section 230 of the fourth embodiment is not provided with the getting off determination section 31 and the getting on determination section 32 as compared with the control section 30 of the first embodiment. Further, the hydraulic excavator 1 of the forth embodiment is not provided with the engine switch sensor 41, the door open/close detection sensor 42, the activation circuit 43, and the timer 46.

(Operation)

Next, the control method of the hydraulic excavator according to the fourth embodiment will be described, and an example of the actuator automatic control method will also be described.

(Control Method at the Time of Getting on)

Since the flow showing the control method at the time of getting on in the fourth embodiment is the same as that in the second embodiment, it will be described with reference to FIG. 11 of the second embodiment.

First, in step S31, the hydraulic excavator 1 is in the stopped state.

Next, when the engine start is detected in step S32, power is supplied from the battery 45 to active the control section 130 in step S33. In the fourth embodiment, the left work implement operating lever 150 is arranged at the retreat position P4 in the vehicle stopped state by the urging force of the tilting spring 62*a*, so that it is not necessary to move the left work implement operating lever 150 to the retreat position P4.

Next, in step S34, the drive signal generation section 33 of the control section 230 creates the neutral position command signal s8, and in step S35, the drive signal generation section 33 transmits the neutral position command signal s8 to the second motor 25. Upon receiving the neutral position command signal s8, in step S36, the second motor 25 moves the left work implement operating lever 150 to the neutral position P3.

Next, in step S37, the hydraulic excavator 1 becomes operable, and the control ends.

(Control Method at the Time of Getting Off)

In the left work implement operating lever unit 315 of the fourth embodiment, when the engine is turned off, the energization to the second motor 25 is stopped, so that the left work implement operating lever 150 is moved to the retreat position P4 by the urging force of the tilting spring 62*a*.

Therefore, it is not necessary to move the left work implement operating lever 150 to the retreat position P4 by the second motor 25 based on the detection result of the engine off.

(Characteristics)

(1)

The hydraulic excavators of the first to third embodiments (an example of a work vehicle) include the left work implement operating lever 150 (an example of an operating lever), the second motor 25 (an example of an actuator), and control sections 30 and 130. The left work implement operating lever 150 operates the work implement 3. The second motor 25 moves the left work implement operating lever 150. The control sections 30 and 130 control the second motor 25 to move the left work implement operating lever 150 to the retreat position P4 or the neutral position P3 (an example of the working position).

As a result, the left work implement operating lever 150 is automatically moved to the retreat position P4 or the neutral position P3, so that it is possible to secure a passage space 6*s* for getting on and off without the need for an operator's operating force.

Further, since the left work implement operating lever 150 is only moved to the retreat position P4, it is not necessary to move the operating lever together with the console box 51.

(2)

The hydraulic excavator of the first to third embodiments (an example of a work vehicle) further includes the engine switch sensor 41 (an example of an operator motion detection sensor). The engine switch sensor 41 detects the operator's motion. The control sections 30 and 130 control the second motor 25 to move the left work implement operating lever 150 to the retreat position P4 or the neutral position P3 (an example of the working position) based on the signal from the engine switch sensor 41.

As a result, it is possible to automatically move the left work implement operating lever 150 to the retreat position P4 or the neutral position P3 based on the engine switch sensor 41 as an example of detecting the motion of the operator.

(3)

In the hydraulic excavators (examples of work vehicles) of the first to third embodiments, when the control sections 30 and 130 acquire information to determine that the operator gets off and determines that the operator gets off, the control sections 30 and 130 control the second motor 25 to move the left work implement operating lever 150 to the retreat position P4.

In this way, when the operator gets off, the left work implement operating lever 150 is automatically moved to the retreat position P4, so that it is possible to secure a passage space for getting on and off without the need for the operator's operating force.

Further, since the left work implement operating lever 150 is only moved to the retreat position P4, it is not necessary to move the operating lever together with the console box 51.

(4)

In the hydraulic excavators (examples of work vehicles) of the first and second embodiments, when the control sections 30 and 130 determine that the operator gets off, the control sections 30 and 130 end the control of the left work implement operating lever 150 after the left work implement operating lever 150 is moved to the retreat position P4 and a predetermined time has elapsed.

For example, even when the information to determine getting off includes the information to turn off the engine, the operating lever can be automatically moved to the retreat position after the engine is turned off.

(5)

The hydraulic excavator of the first and second embodiments (an example of a work vehicle) further includes the second neutral spring 27 (an example of a first urging member). The second neutral spring 27 urges the left work implement operating lever 150 to the neutral position P3 in the operating range R1.

When the second neutral spring 27 is provided in this way, the left work implement operating lever 150 automatically moves to the retreat position P4 by the second motor 25 against the urging force of the second neutral spring 27.

Further, in the situation that the operator gets off, after the left work implement operating lever 150 is moved to the retreat position P4, the left work implement operating lever 150 is automatically returns to the neutral position P3 by the second neutral spring 27 when the left work implement operating lever 150 is not particularly held at the retreat position P4.

(6)

The hydraulic excavator (an example of a work vehicle) of the first and fourth embodiments is further provided with holding parts 61 and 62. The holding parts 61 and 62 hold the left work implement operating lever 150 at the retreat position P4 outside the operating range R1 of the left work implement operating lever 150.

As a result, the left work implement operating lever 150 can be held at the retreat position P4 even when the operator gets off and the power is turned off.

(7)

The hydraulic excavator 1 (an example of a work vehicle) of the first and second embodiments further includes the second neutral spring 27 (an example of a first urging member). The second neutral spring 27 urges the left work implement operating lever 150 to the neutral position P3 in the operating range R1. The control section 30 acquires information to determine that the operator gets on, and determines that the operator gets on, the control section 30 controls the second motor 25 to move the left work implement operating lever 150 to the retreat position P4.

When the second neutral spring 27 is provided in this way, the left work implement operating lever 150 is arranged at the neutral position P3 in the power-off state. Therefore, by automatically moving the left work implement operating lever 150 to the retreat position P4 when it is determined that the operator gets on, it is possible to secure a passage space for getting on and off without the need for the operator's operating force.

Further, since the left work implement operating lever 150 is only moved to the retreat position P4, it is not necessary to move the left work implement operating lever 150 together with the console box 51.

(8)

In the hydraulic excavator 1 (an example of a work vehicle) of the first embodiment, the control section 30 moves the left work implement operating lever 150 to the neutral position P3 in the operation range R1 when the engine start is detected after determining that the operator gets on and moving the left work implement operating lever 150 to the retreat position P4.

As a result, when the operator works, the left work implement operating lever 150 automatically moves to the neutral position P3, so that operator can transition smoothly to the operation from getting on.

(9)

In the hydraulic excavator 1 (an example of a work vehicle) of the first to fourth embodiments, when the control sections 30 and 130 acquire information to determine that the operator gets on and determine that the operator gets on, the control sections 30 and 130 move the left work implement operating lever 150 to the neutral position P3 in the operation range R1 from the retreat position P4 by the engine start being detected.

As a result, even in the state where the left work implement operating lever 150 is moved to the retreat position P4 during getting on, the left work implement operating lever 150 is automatically moved to the neutral position P3 when the operator works. As a result, operator can transition smoothly to the operation from getting on.

(10)

In the hydraulic excavator 1 (an example of a work vehicle) of the first to fourth embodiments, the control sections 30 and 130 end the control when the engine start is not detected for a predetermined time.

Even when acquiring the information to determine getting on and determining that the operator gets on, the work by the work implement 3 may not be performed. Therefore, when the engine is not started for a predetermined time, it is possible to determine that the work is not performed and end the control. The end of the control may be, for example, the power off state.

(11)

In the hydraulic excavator 1 (an example of a work vehicle) of the first to fourth embodiments, the retreat position P4 is arranged on the opposite side of the passage space S for the operator to get off with reference to the neutral position P3 in the operating range R1.

As a result, the passage when getting off can be widened, and the operator can easily get off.

(12)

In the hydraulic excavator 1 (an example of a work vehicle) of the first to fourth embodiments, the information to determine that the operator gets off includes at least one of the off information about the engine switch, the operation information about the lock lever that locks the operation of the vehicle at the time of getting off, seatbelt sensor attachment/detachment information, seating information from the seating sensor, operator posture information, operating lever gripping information, or operator motion information.

As a result, it is possible to determine that the operator gets off.

(13)

In the hydraulic excavator 1 (an example of a work vehicle) of the first to fourth embodiments, the information to determine getting off includes one of door open/close information, door lock release information, handrail gripping information, getting on step weight information, and operator's detection information.

As a result, it is possible to determine that the operator gets on.

(14)

The hydraulic excavator 1 (an example of a work vehicle) of the first to third embodiments includes a left work implement operating lever 150 (an example of an operating lever), a second motor 25 (an example of an actuator), and control sections 30 and 130. The left work implement operating lever 150 operates the work implement 3. The second motor 25 moves the left work implement operating lever 150. When the control sections 30 and 130 acquire information to determine that the operator gets on and determines that the operator gets on, the control sections 30 and 130 perform control of driving the second motor 25 to move the left work implement operating lever 150 to the retreat position P4.

In this way, when the operator gets on, the left work implement operating lever 150 is automatically moved to the retreat position P4, so that it is possible to secure a passage space for getting on and off without the need for the operator's operating force.

Further, since the left work implement operating lever 150 is only moved to the retreat position P4, it is not necessary to move the operating lever together with the console box 51.

(15)

The left work implement operating lever units 115 and 315 (an example of the lever unit) of the second and fourth embodiments include a left work implement operating lever 150, a second motor 25, and holding parts 61 and 62. The left work implement operating lever 150 operates the work implement 3. The second motor 25 moves the left work implement operating lever 150. The holding parts 61 and 62 hold the left work implement operating lever 150 at the retreat position P4 outside the operating range R1 of the left work implement operating lever 150.

As a result, the left work implement operating lever 150 can be held at the retreat position P4 even when the operator gets off and the power is turned off.

(16)

In the left work implement operating lever unit 115 (an example of the lever unit) of the second embodiment, the holding part 61 holds the left work implement operating lever 150 moved to the retreat position P4 by the drive of the second motor 25.

As a result, the left work implement operating lever 150 that has automatically moved to the retreat position P4 by the drive of the second motor 25 can be held at the retreat position P4.

(17)

In the left work implement operating lever unit 315 (an example of a lever unit) of the fourth embodiment, the holding part 62 includes the tilting spring 62*a* (an example of a second urging member) that urges the left work implement operating lever 150 to the retreat position P4.

As a result, it is possible to automatically moved the left work implement operating lever 150 to the retreat position P4 by the urging force of the tilting spring 62*a* and hold the left work implement operating lever 150 at the retreat position P4.

(18)

The actuator automatic control method of the first to third embodiments is a method of automatically controlling the second motor 25 (an example of an actuator) of the left work implement operating lever 150 (an example of an operating lever) for operating the work implement 3 and includes steps S5, S9, S24, S34, S44 (an example of a generation step) and steps S6, S10, S25, S35, S45 (an example of a transmission step). Steps S5, S9, S24, S34, and S44 generates the retract command signal s3 or the neutral position command signal s8 (an example of a control signal) of the second motor 25 (an example of an actuator) for moving the left work implement operating lever 150 to the retreat position P4 or the neutral position P3 (an example of the working position). Steps S6, S10, S25, S35, and S45 transmit the retreat command signal s3 or the neutral position command signal s8 to the second motor 25.

As a result, the left work implement operating lever 150 is automatically moved to the retreat position P4 or the neutral position P3, so that it is possible to secure a passage space for getting on and off without the need for operating force by the operator.

Further, since the left work implement operating lever 150 is only moved to the retreat position P4, it is not necessary to move the operating lever together with the console box 51.

(19)

The actuator automatic control method of the first to third embodiments further includes steps S2, S8, S22, S32, and S42 (an example of a detection step). Steps S2, S8, S22, S32, and S42 detect the motion of the operator. In steps S5, S9, S24, S34, and S44 (an example of the generation step) the retract command signal s3 or the neutral position command signal s8 (an example of a control signal) to the second motor 25 for moving the left work implement operating lever 150 (an example of an operating lever) to the retreat position P4 or the neutral position P3 (an example of the working position) is generated.

(20)

The actuator automatic control method of the first to third embodiments includes steps S22 and S42 (an example of a first acquisition step) and steps S23 and S43 (an example of a determination step). In steps S22 and S42 information to determine that the operator gets off is acquired from the hydraulic excavator 1. In steps S23 and S43 it is determined whether or not the operator gets off from the acquired information. In steps S24 and S44 (an example of the generation step) the retract command signal s3 (an example of an control signal) of the second motor 25 for moving the left work implement operating lever 150 for operating the work implement 3 to the retreat position P4 is generated.

In this way, when the operator gets off, the left work implement operating lever 150 is automatically moved to the retreat position P4, so that it is possible to secure a space for getting on and off without the need for the operator's operating force.

Further, since the left work implement operating lever 150 is only moved to the retreat position P4, it is not necessary to move the left work implement operating lever 150 together with the console box 51.

(21)

The actuator automatic control method of the first to third embodiments includes step S2 (an example of a second acquisition step), step S3 (an example of a determination step), and step S7 (an example of a movement step). In step S2, information to determine that the operator gets on is acquired from the hydraulic excavator 1 (an example of a work vehicle). In step S3, it is determined whether or not the operator gets on from the acquired information. In step S7, when it is determined that the operator gets on, the left work implement operating lever 150 is moved to the retreat position P4.

In this way, when the operator gets on, the left work implement operating lever 150 is automatically moved to the retreat position P4, so that it is possible to secure a passage space for getting on and off without the need for the operator's operating force.

Further, since the left work implement operating lever 150 is only moved to the retreat position P4, it is not necessary to move the operating lever together with the console box 51.

Other Embodiments

Although one embodiment of the present invention has been described above, the present invention is not limited to the above embodiment, and various modifications can be made without departing from the gist of the invention.

(A)

In the third embodiment, a magnet is used as the holding part 61, but it is not limited to the magnet, and a fitted portion such as a recess is formed on one side of the left work implement operating lever 150 and the frame and a fitting portion such as a convex portion may be formed on the other side.

Further, the holding part 61 may be, for example, a detent or the like. That is, a member in which the detent ball is arranged may be provided, and a groove into which the detent ball may be fitted may be formed in the left work implement operating lever 150.

(B)

In the above first to forth embodiments, since the passage space 6*s* is provided on the left side of the cab 6, the passage space 6*s* is expanded by moving the left work implement operating lever 150 to the retreat position P4. When the passage space 6*s* is provided on the right side, the right work implement operating lever 160 may be moved to the retreat position.

(C)

In the first embodiment, the first neutral spring 26 and the second neutral spring 27 are provided, and the urging force of these can give an operation feeling to the left work implement operating lever unit 15. Therefore, the first motor 24 may not be provided in the left work implement operating lever unit 15. The second motor 25 is required to move the left work implement operating lever 150 to the retreat position P4. Further, since the right work implement operating lever 160 does not need to be moved to the retreat position P4, the right work implement operating lever unit 16 may not be provided with both the first motor 24 and the second motor 25.

(D)

In the second embodiment, since the holding part 61 holding with a magnet or the like is provided, the retreat position P4 is set to the back side of the operation range R1, but in the first, third, and fourth embodiments (described above), the retreat position P4 may be set within the operation range R1. In this case, it is preferable to set the retreat position P4 to the position farthest from the passage space 6*s* within the operating range R1.

(E)

In the above-described first to fourth embodiments, the hydraulic excavator has been described as an example of the work vehicle, but it may be not limited to the hydraulic excavator, and may be a wheel loader or the like.

(F)

In the above first to forth embodiments, a work vehicle using tracks is taken as an example, but in the case of a work vehicle using wheels instead of tracks, the information to determine getting off may include on information about the parking switch, or information about the shift position of the transmission. On information about the parking switch is information on turning on the parking switch when parking the work vehicle. The information about the shift position of the transmission is information on shifting the transmission to, for example, neutral or parking.

(G)

In the above first to forth embodiments, the neutral position P3 is taken as an example of the working position, but the working position is not limited to this, and the working position may be any position in the operation range R1.

According to the work vehicle and the actuator automatic control method of the present invention, it is possible to secure a passage space for getting on and off without the need for an operator's operating force, and it is useful as, for example, a hydraulic excavator.

The invention claimed is:

1. A work vehicle comprising:

an operating lever configured to operate a work implement;

an actuator configured to move the operating lever;

a control section configured to control the actuator to move the operating lever to a retreat position outside an operation range of the operating lever; and a first urging member urging the operating lever to a neutral position in the operating range, the operating lever being configured to be movable to the retreat position by the actuator against an urging force of the first urging member, the operating lever being configured to be movable longitudinally and laterally through the operation range to control the work implement.

2. The work vehicle according to claim 1, further comprising:

an operator motion detection sensor configured to detect an operator's motion, the control section being configured to control the actuator to move the operating lever to the retreat position based on a signal from the operator motion detection sensor.

3. The work vehicle according to claim 1, wherein the control section is configured to control the actuator to move the operating lever to the retreat position when the control section acquires information to determine that an operator gets off and determines that the operator gets off.

4. The work vehicle according to claim 1, wherein when the control section determines that an operator gets off, the control section is configured to end control of the actuator after the operating lever is moved to the retreat position and a predetermined time elapses.

5. The work vehicle according to claim 1, further comprising:

a holding part configured to hold the operating lever at the retreat position.

6. The work vehicle according to claim 1, wherein the control section is configured to control the actuator to move the operating lever to the retreat position when the control section acquires information to determine that an operator gets on and determines that the operator gets on.

7. The work vehicle according to claim 6, wherein when the control section determines that an operator gets on, the control section is configured to move the operating lever to a neutral position in the operation range by an engine start being detected after moving the operating lever to the retreat position.

8. The work vehicle according to claim 1, wherein when the control section acquires information to determine that an operator gets on and determines that the operator gets on, the control section is configured to move the operating lever to a neutral position in the operation range from the retreat position by an engine start being detected.

9. The work vehicle according to claim 7, wherein the control section is configured to end control of the actuator when an engine start is not detected for a predetermined time.

10. The work vehicle according to claim 1, wherein the retreat position is arranged on an opposite side of a passage where an operator gets off with respect to a neutral position in the operation range.

11. The work vehicle according to claim 3, wherein the information to determine that an operator gets off includes at least one of engine switch off information, operation information about a lock lever locking an operation of the work vehicle when getting off, seatbelt sensor information, seating sensor information, door lock locking information, operator posture information, operating lever gripping information, operator motion information, on information about a parking switch, and transmission shift position information.

12. The work vehicle according to claim 6, wherein the information to determine that an operator gets on includes at least one of door open close information, door lock release information, handrail gripping information, getting on step weight information, and operator detection information.

13. A work vehicle comprising:

an operating lever configured to operate a work implement;

an actuator configured to move the operating lever;

a control section configured to perform a control of operating the actuator to move the operating lever to a retreat position when acquiring information to determine that a human operator gets on and determining that the operator gets on; and a first urging member urging the operating lever to a neutral position in an operation range, the operating lever being movable to the retreat position by the actuator against an urging force of the first urging member, the operating lever being movable longitudinally and laterally within the operation range to control the work implement.

14. A lever unit comprising:

an operating lever configured to operate a work implement;

an actuator configured to move the operating lever; and a holding part configured to hold the operating lever at a retreat position outside an operating range of the operating lever a first urging member urging the operating lever to a neutral position in an operation range, the operating lever being movable to the retreat position by the actuator against an urging force of the first urging member, the operating lever being movable longitudinally and laterally within the operation range to control the work implement.

15. The lever unit according to claim 14, wherein the holding part is configured to hold the operating lever moved to the retreat position by driving the actuator.

16. The lever unit according to claim 14, wherein the holding part includes a second urging member urging the operating lever to the retreat position.

17. An actuator automatic control method for automatically control an actuator of an operating lever for operating a work implement, the actuator automatic control method comprising:

generating a control signal of the actuator to move the operating lever to a retreat position outside an operation range of the operating lever; and transmitting the control signal to the actuator, a first urging member urging the operating lever to a neutral position in an operation range, the operating lever being movable to the retreat position by the actuator against an urging force of the first urging member, the operating lever being movable longitudinally and laterally within the operation range to control the work implement.

18. The actuator automatic control method according to claim 17, further comprising:

detecting a motion of a human operator, the control signal of the actuator to move the operating lever to the retreat position being generated based on a detection result.

19. The actuator automatic control method according to claim 17, further comprising:

acquiring information to determine that an operator gets off from a work vehicle; and determining whether or not the operator gets off from acquired information, the control signal of the actuator to move the operating lever to operate the work implement to the retreat position being generated when it is determined that the operator gets off.

20. The actuator automatic control method according to claim 17, further comprising:

acquiring information to determine that an operator gets on to a work vehicle; and determining whether or not the operator gets on from acquired information; and moving the operating lever to the retreat position when it is determined that the operator gets on.

* * * * *